(12) United States Patent
Ogawa et al.

(10) Patent No.: US 10,093,370 B2
(45) Date of Patent: Oct. 9, 2018

(54) SEAT DEVICE

(71) Applicant: TS TECH CO., LTD., Asaka-shi, Saitama (JP)

(72) Inventors: Tatsuro Ogawa, Tochigi (JP); Ryuji Isobe, Tochigi (JP); Yuichi Honma, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 20 days.

(21) Appl. No.: 15/110,263

(22) PCT Filed: Jan. 7, 2015

(86) PCT No.: PCT/JP2015/050267
§ 371 (c)(1),
(2) Date: Jul. 7, 2016

(87) PCT Pub. No.: WO2015/105126
PCT Pub. Date: Jul. 16, 2015

(65) Prior Publication Data
US 2016/0325799 A1    Nov. 10, 2016

(30) Foreign Application Priority Data

Jan. 9, 2014 (JP) ................................. 2014-002488

(51) Int. Cl.
*B62J 1/00* (2006.01)
*B60N 2/62* (2006.01)
(Continued)

(52) U.S. Cl.
CPC ................ *B62J 1/005* (2013.01); *B60N 2/40* (2013.01); *B60N 2/62* (2013.01); *B62J 1/007* (2013.01);
(Continued)

(58) Field of Classification Search
CPC ..... B62J 1/005; B62J 1/007; B62J 1/10; B62J 1/12; B62J 2099/002; B60N 2/40; B60N 2/62; B60N 2002/0288
See application file for complete search history.

(56) References Cited

U.S. PATENT DOCUMENTS 4,673,212 A * 6/1987 Mayer ...................... B62J 1/10
297/195.12
4,776,632 A * 10/1988 Akimori .................... B62J 1/12
297/215.12
(Continued)

FOREIGN PATENT DOCUMENTS

JP    48-002529 Y    1/1973
JP    62-065377 U    4/1987
(Continued)

*Primary Examiner* — Philip F Gabler
(74) *Attorney, Agent, or Firm* — Drinker Biddle & Reath LLP

(57) ABSTRACT

A seat device that is capable of improving body pressure distribution during traveling is provided. In a seat device including a seating seat, in both of end portions in the seat width direction of the seating seat, at positions interposed between the bottom plate and a cushion member of the seating seat, turning plates are provided. The parts of the cushion member, where the turning plates are provided between the same and the bottom plate, constitute turning parts that turn around edges thereof on the width direction inner sides as base points, as the turning plates turn. In the cushion member, slits are formed at boundary positions between the turning parts and a non-turning part, that is, a part other than the turning parts.

22 Claims, 21 Drawing Sheets

(51) Int. Cl.
  *B60N 2/40* (2006.01)
  *B62J 1/12* (2006.01)
  *B62J 1/10* (2006.01)
  B60N 2/02 (2006.01)
  B62J 99/00 (2009.01)

(52) U.S. Cl.
  CPC . *B62J 1/10* (2013.01); *B62J 1/12* (2013.01); *B60N 2002/0288* (2013.01); *B62J 2099/002* (2013.01)

(56) References Cited

U.S. PATENT DOCUMENTS

| | | | | |
|---|---|---|---|---|
| 4,804,221 A | * | 2/1989 | Saiki | B62J 1/10 297/243 |
| 4,924,163 A | * | 5/1990 | Sakamoto | B60N 2/0224 297/284.9 |
| 2012/0043791 A1 | | 2/2012 | Kojima | |
| 2014/0327280 A1 | * | 11/2014 | Honma | B62J 1/007 297/195.12 |

FOREIGN PATENT DOCUMENTS

| | | |
|---|---|---|
| JP | 63-041969 Y | 11/1988 |
| JP | 02-296584 A | 12/1990 |
| JP | 2006-224808 A | 8/2006 |
| JP | 2007-331724 A | 12/2007 |
| JP | 4381093 B2 | 12/2009 |
| JP | 5099226 B2 | 12/2012 |

\* cited by examiner

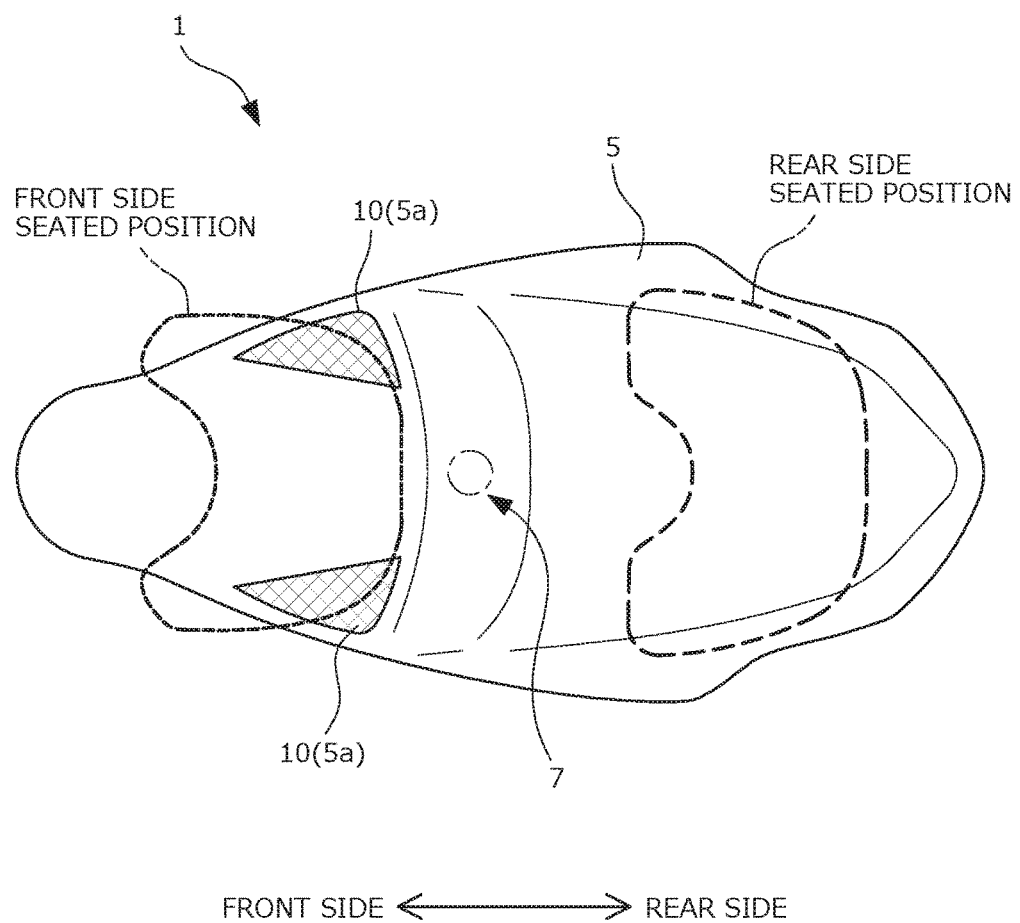

DURING STOP

DURING TRAVEL

SEAT DEVICE

CROSS-REFERENCE TO RELATED APPLICATIONS

This application is a National Stage Entry application of PCT Application No. PCT/JP2015/050267, filed Jan. 7, 2015, which claims the priority benefit of Japanese Patent Application No. 2014-002488, filed Jan. 9, 2014, the contents being incorporated herein by reference.

BACKGROUND

The present disclosure relates to a seat device of a vehicle, the seat device including a seat on which a rider of the vehicle is seated. The present disclosure particularly relates to a seat device in which both of width direction end areas of a seating surface of the seat are turned by actions of action bodies provided at both of width direction end portions of the seat.

As a characteristic of a seat that a rider straddles to be seated thereon, like a seat installed on a motorcycle, sitting pressure (body pressure) distribution during traveling is required. Here, the sitting pressure distribution refers to a degree of distribution of a force that the rider exerts to the seat during traveling, and as the distribution is higher, the load on the rider (so-called tiredness from sitting) is reduced.

On the other hand, in order to improve the above-described sitting pressure distribution, a contact area of the seating surface of the seat with the rider's buttocks may be increased by holding up and supporting the rider's thighs, or the like, during traveling. As a configuration for holding the rider's thighs during traveling, for example, the configuration disclosed in Japanese Patent Publication JP 4381093 can be used. In the seat disclosed in Japanese Patent Publication JP 4381093, air cushions are provided between a bottom plate and an outer layer member, so that the shape of the seating surface of the seat can be changed by adjusting the internal air pressure of the air cushion.

More specifically, in the seat disclosed in Japanese Patent Publication JP 4381093, the above-described air cushions are positioned at both of width direction end portions of the seat, the inflation of the air cushion causes both of the width direction end areas of the seating surface of the seat to move in such a direction that the end areas are separated from the ground. In such a state, the thighs of the rider seated on the seat are lifted up, so that the sitting pressure is distributed appropriately.

According to the configuration, as in Japanese Patent Publication JP 4381093, in which action bodies such as air cushions are arranged at both of the end portions in a width direction of the seat and are caused to act to change the shape of the seating surface of the seat, parts surrounding the action bodies, which are more specifically cushion members and an outer layer member arranged above the action bodies, also move, following the action of the action bodies. Here, it is desirable that the motions of these members can follow the movements of the action bodies excellently. On the other hand, the cushion members, the outer layer member, and the like are required to have certain hardness or firmness from the viewpoint of shape keeping. It is therefore required to retain the shape during a normal time, and to cause the cushion members and the outer layer member to follow the movements of the action bodies when the shape of the seating surface of the seat is changed. It is however difficult for conventional configurations including that of Japanese Patent Publication JP 4381093 to satisfy the above-described requisition, which possibly makes it difficult to change the shape of the seating surface of the seat.

Further, the action bodies and equipment attached thereto (for example, an actuator as a power source) have to be arranged at positions at which they can exhibit the functionalities thereof excellently, and they do not adversely influence the seating properties (e.g., sitting comfort).

SUMMARY

The present disclosure has been made in light of the above-described problems, and a feature of an embodiment of the present disclosure is to provide the following device as a seat device in which both of end portions of a seat in a seat width direction thereof are movable so that the shape of the seating surface of the seat are changeable: a device in which the movable portions of the seat in both of the end portions in the seat width direction are displaced according to movements of action bodies provided in the inside of the seat, and the amount of the displacement is adjustable. Further, another feature of an embodiment of the present disclosure is to prevent the seating properties of the seat from being adversely affected by the arrangement of the action bodies.

The above-described features are achieved by an embodiment of the seat device of the present disclosure that includes: a seat that includes a bottom plate, a cushion member supported by the bottom plate, an outer layer member covering the cushion member; and action bodies that are provided in both of end portions in the seat width direction of the seat, respectively, in a state of being interposed between the bottom plate and the cushion member, wherein at least a part of each of the width direction end portions forms a movable portion that is displaced as the action body acts, and wherein, in each of the end portions in the seat width direction, an interlocking property improving portion for improving interlocking properties when the movable portion is displaced as the action body acts is provided in at least one of the cushion member and the outer layer member, and forms a boundary between the movable portion and a part other than the movable portion. In the above-described seat device, the interlocking property improving portion is provided in at least one of the cushion member and outer layer member, whereby movable portions provided in both of the end portions in the seat width direction of the seat excellently follow the action of the action body, and are smoothly displaced. In the above-described seat device, therefore, the shape of the seated surface of the seat can be changed excellently, and further, the amount of the change in shape can be adjusted easily.

In an embodiment, the action body is a member in a flat plate form, and the interlocking property improving portion is a notch formed along the outer edge of the action body in the cushion member. With such a configuration, notches as interlocking property improving portions are formed in the cushion member, which allow the parts of the cushion member corresponding to the movable portions to excellently follow the action of the action body. Further, as the notches are formed along the outer edges of the action bodies, the parts of the cushion member corresponding to the movable portions can be further easily deformed. This improves the body pressure distribution.

In an embodiment, the seat device further includes a power source for imparting power to the action body, and the power source is provided at a position separated from the interlocking property improving portion, in a state of being interposed between the bottom plate and the cushion member. Such a configuration makes it possible to arrange the power source without affecting the equipment layout in the seat. In particular, by arranging the power source at a position separated from the interlocking property improving portion, it is possible to prevent the power source from hindering the deformation of the cushion member.

In an embodiment of the seat device, a cable for transmitting the power from the power source to the action body is laid along a support surface of the bottom plate, the support surface supporting the cushion member. In such a configuration, as the cable is laid along the support surface of the bottom plate supporting the cushion member, it is possible to prevent the cable from adversely affecting the seating properties of the seat.

In an embodiment, the action body is a member in a flat plate form, and the cable is pulled by an actuator as the power source. The seat device further includes a contact member that is arranged between the action body and the bottom plate, to be in contact with the action body, wherein, as the cable is pulled, one end portion of the contact member with which the cable is engaged moves toward the other end portion of the contact member, which causes an intermediate portion of the contact member, positioned between the one end portion and the other end portion of the contact member, to be bent in such a direction that the intermediate portion presses the action body, and wherein, on the bottom plate, projection-form guide portions are provided at positions in the seat width direction between which the contact member is interposed, along the direction in which the one end portion is moved. In the above-described configuration, when the cable is pulled by the actuator, one end portion of the contact member moves toward the other end portion. As a result, the intermediate portion of the contact member is bent thereby pressing the action body, and the action body thus pressed causes the movable portion of the seat to turn. Here, since the one end portion of the contact member moves, guided by the guide portions provided on the bottom plate, the one end portion is caused to appropriately move toward the other end portion of the contact member. Further, by providing the projection-form guide portions, the rigidity of the bottom plate, in particular, the rigidity in the vicinities of the area where the action body is arranged, can be increased.

In an embodiment, the seat is a "two-seater" seat having a front end portion and a rear end portion on which riders of a vehicle are seated, respectively, and the power source is arranged between seated positions of the front end portion and the rear end portion in the front to back direction of the seat. With such a configuration, in a space between the riders' seated positions, that is, at a position where riders are not seated, the power source is arranged, and it is therefore possible to prevent the power source from adversely affecting the seating properties of the seat.

In an embodiment, the power source is arranged in a center part of the seat in the seat width direction. In such a configuration, the power source can be more easily arranged in the seat. More specifically, in a two-seater seat, in a part positioned between the seated positions, the space in the width direction center part is larger than the spaces in the end portions in the seat width direction, and the power source can be arranged easily therein. When the power source is arranged between the riders' seated positions, therefore, the power source may be arranged in the width direction center part of the seat, whereby the arrangement of the power source is facilitated.

In an embodiment, the seat device includes a power source for imparting power to the action body, and a power transmission body that works for transmitting the power from the power source to the action body, wherein the seat includes a tensile force applying member that has one end portion bonded to the outer layer member so that the tensile force applying member is stretched, thereby imparting tensile force to the outer layer member, wherein the other end portion of the tensile force applying member is fixed to the power transmission body, and wherein, when the action body acts so that the movable portion is displaced toward a rider seated on the seat, the power transmission body moves integrally with the other end portion, whereby the state of the tensile force applying member makes a transition from a stretched state to a loose state. In such a configuration, when the action body acts so that the movable portion is displaced toward the rider seated on the seat, the power transmission body moves integrally with the other end of the tensile force applying member, whereby the tensile force applying member makes a transition from a stretched state to a loose state. This allows the outer layer member to more easily follow the action (e.g., movement) of the action body. Then, when the outer layer member moves until the movable portion is displaced to the predetermined position, the state of the tensile force applying member is returned to the stretched state again, which causes the tensile force to be again applied to the outer layer member, whereby the outer layer member exhibits excellent appearance.

In an embodiment, the action body is a member in a flat plate form, and the cable is pulled by an actuator as the power source. The seat device may further include a contact member that is housed in a turnable state in a housing unit that is in a cavity form provided in the bottom plate, the contact member being in contact with the action body, wherein, as the cable is pulled, the contact member is turned to such a position that a part of the contact member protrudes out of the housing unit, and the action body, pressed by the protruding part of the contact member, acts to displace the movable portion. In the above-described configuration, the contact member is housed in the cavity-form housing unit formed in the bottom plate, and when the action body is caused to act, a part of the contact member protrudes out of the housing unit. This makes it possible to reduce the space where the contact member is arranged, and to design the layout of the seat appropriately.

In an embodiment, on a surface of the action body on a side opposed to the contact member, a reinforcement rib formed in a lattice form is provided. With such a configuration, since the reinforcement rib in a lattice form is provided, the action body can be light-weighted while the rigidity of the action body is secured.

In an embodiment, in a surface of the action body on a side opposed to the contact member, an area in contact with the contact member protrudes toward the contact member. In such a configuration, since in a surface of the action body on a side opposed to the contact member, an area in contact with the contact member protrudes, the rigidity in the vicinities of the area can be further increased.

In an embodiment, on an outer surface of the contact member, a reinforcement rib formed in a lattice form is provided. In such a configuration, since a lattice-form reinforcement rib is provided, the contact member can be light-weighted while the rigidity of the contact member is secured.

In an embodiment, on the bottom plate, a cable housing groove is formed, the cable housing groove being formed for laying the cable along the support surface, and on an interior wall of the cable housing groove, a projected portion for coming into contact with the cable housed in the cable housing groove is formed to fix the position of the cable. In the above-described configuration, the cable comes into contact with the projected portion in the cable housing groove, whereby the position of the cable is fixed. This makes it possible to lay the cable smoothly, thereby improving the operation efficiency of the seat assembling work.

In an embodiment, the seat is a seat on which a rider of a vehicle is seated, the action body turns around a turning axis provided at one end side of the action body in the seat width direction, and at a position in the seat width direction outside a range where an ischium of the rider in the state of being seated on the seat is present, the action body and the turning axis are arranged. Commonly, in a range where the rider's ischium is present, the pressure (sitting pressure) applied to the seated surface of the seat is high, but in the above-described configuration, the action body and the turning axis thereof are arranged at positions in the seat width direction outside the range where the ischium of the rider seated on the seat is present. This allows the action body to appropriately act, without giving the rider discomfort. Further, since the action body acts at a position in the seat width direction outside the range where the rider's ischium is present, the sitting pressure in the vicinities of the ischium can be distributed. As a result, the load applied to the buttocks of the rider when the sitting pressure in the vicinities of the ischium increases can be reduced.

In an embodiment, the cable for transmitting power from the power source to the action body provided at the one end portion in the seat width direction, and the cable for transmitting power from the power source to the action body provided at the other end portion in the seat width direction, are provided separately, and power from the power source is transmitted to the action bodies exclusively via corresponding one of the cables provided separately for the action bodies, respectively. In the above-described configuration, the two cables are laid in respective states independent from each other, and each action body receives power from the power source exclusively via a corresponding one of the two cables. This makes it possible to lay each cable, with bending of the cables in the midway of the laying route being relatively reduced. This reduces the loss (traction loss) in cable traction, whereby the power transmission to the action bodies can be performed appropriately.

In an embodiment, the seat may be a seat on which a rider of a vehicle is seated, and the seat device may further include: a sensor for detecting a travel speed of the vehicle; a control mechanism for controlling the action body; and a switch that is turned on/off for switching the presence/absence of control by the control mechanism, wherein, when the switch is in an ON state, the control mechanism controls the action body according to the detection result by the sensor. In the above-described configuration, when the switch is in an ON state, the action body is caused to act according to the travel speed of the vehicle, so that the shape of the seated surface of the seat is changed. With this configuration, for example, while the vehicle is stopped or when the rider gets off the vehicle, the action bodies are not caused to act, whereby the feet of the rider seated on the seat are allowed to easily land on the ground. On the other hand, while the vehicle is traveling at a relatively high speed, the action bodies are caused to act, so that the shape of the seated surface of the seat is changed, whereby the thighs of the rider are lifted up, and the sitting pressure is distributed appropriately. Further, since the action body acts exclusively while the switch is in an ON state, it is possible to more readily confirm which mode is activated, the mode for changing the shape of the seated surface or the mode for not changing the same.

In an embodiment, the seat device may further include: a control mechanism for controlling the action body; and an action amount adjusting switch to be operated for adjusting an amount of action of the action body, wherein the control mechanism controls the action body so that the action body acts to provide the amount of action adjusted through the operation of the action amount adjusting switch. In the above-described configuration, the amount of action of the action body can be selectively adjusted through the operation of the action amount adjusting switch. When the user causes the action bodies to act to change the shape of the seated surface of the seat, the user therefore is allowed to adjust the amount of action of the action body so that a preferable shape can be obtained.

In an embodiment of the seat device, the bottom plate includes, in a part positioned on an outer side in the seat width direction with respect to the contact member, a flat portion that is formed with a surface on the same side as the side of the outer layer member, the surface being flat. In the above-described configuration, the flat portion is provided at a position on the bottom plate on the outer side in the seat width direction with respect to the contact member, and the surface of the flat portion on the same side as the side of the outer layer member is a flat surface. With such a configuration, a space can be secured on the flat portion, and when, for example, the outer layer member is fit, the space may be utilized, whereby the operation can be performed efficiently.

In an embodiment of the seat device, the action body turns around a turning axis provided at one end side of the action body in the seat width direction, and the seat device further includes a pressing member that presses the one end side of the action body toward the bottom plate, in a state of straddling over the turning axis in the seat width direction. In the above-described configuration, the action body is pressed by the pressing member. This makes it possible to suppress flapping of the action body while the action body is not acting, and as a result, the shape of the seated surface of the seat, and the appearance of the seat can be maintained excellently.

In an embodiment of the seat device, in the cushion member, a groove for allowing the outer layer member to be fit therein is formed, and the groove is formed to reach a range in a cushion member thickness direction where the action body is present, and to pass along a side in the seat width direction of the action body. In the above-described configuration, the groove formed in the cushion member in order to fit the outer layer member therein reaches the range in the cushion member thickness direction where the action body is present, and passes along a side in the seat width direction of the action body. With such a configuration, the above-described groove allows the outer layer member to be appropriately fit, and the above-described groove also allows the action body to smoothly act.

In an embodiment of the seat device, an end portion of the outer layer member is fixed to the action body, to act integrally with the action body. In the above-described configuration, the end portion of the outer layer member is fixed to the action body, and as the action body acts, the end portion of the outer layer member and the action body integrally act. With such a configuration, it is possible to prevent slack from occurring to the outer layer member as the action body acts, and as a result, the appearance of the seat can be maintained excellently.

According to an embodiment of the present disclosure, the movable portions provided in both of the end portions in the seat width direction of the seat excellently follow the action of the action body, and are smoothly displaced. As a result, the shape of the seated surface of the seat can be changed excellently, and further, the amount of the change can be adjusted easily. Further, according to an embodiment of the present disclosure, notches as interlocking property improving portions are formed in the cushion member, which allow the parts of the cushion member corresponding to the movable portions to excellently follow the actions of the action bodies. Further, as the notches are formed along the outer edges of the action bodies, the parts of the cushion member corresponding to the movable portions can be further easily deformed, which improves the body pressure distribution. Further, according to an embodiment of the present disclosure, by arranging the power source at a position separated from the notches, it is possible to prevent the power source from hindering the deformation of the cushion member. Further, according to an embodiment of the present disclosure, as the cable is laid along the support surface of the bottom plate supporting the cushion member, it is possible to prevent the cable from adversely affecting the seating properties of the seat. Further, according to an embodiment of the present disclosure, the one end portion of the contact member is caused to appropriately move toward the other end portion of the contact member, while being guided by the guide portions provided on the bottom plate. By providing the projection-form guide portions, the rigidity of the bottom plate, in particular, the rigidity in the vicinities of the area where the action body is arranged, can be increased. Further, according to an embodiment of the present disclosure, by arranging the power source between the seated positions of the riders, the power source can be prevented from adversely affecting the seating properties of the seat. Further, according to an embodiment of the present disclosure, the power source can be more easily arranged in the seat. Further, according to an embodiment of the present disclosure, when the action body acts so that the movable portion is displaced toward the rider seated on the seat, the tensile force applying member comes to have slack, thereby allowing the outer layer member to easily follow the action of the action body. Then, when the outer layer member moves until the movable portion is turned to the predetermined position, the tensile force applying member is stretched again, thereby again applying the tensile force to the outer layer member, whereby the outer layer member exhibits excellent appearance. Further, according to an embodiment of the present disclosure, the space where the contact member is arranged can be reduced, whereby the layout of the seat can be designed appropriately. Further, according to an embodiment of the present disclosure, the contact member can be more lightweight while the rigidity of the contact member is secured. Further, according to an embodiment of the present disclosure, the rigidity in the vicinities of the area in contact with the contact member, in a surface of the action body on a side opposed to the contact member, can be further increased. Further, according to an embodiment of the present disclosure, the contact member can be reduced in weight while the rigidity of the contact member is secured. Further, according to an embodiment of the present disclosure, the cable can be laid smoothly, whereby the operation efficiency of the seat assembling work can be improved. Further, according to an embodiment of the present disclosure, the action body is allowed to appropriately act, without giving the rider discomfort. Further, since the sitting pressure in the vicinities of the rider's ischium can be distributed, the load applied to the buttocks of the rider when the sitting pressure in the vicinities of the ischium increases can be reduced. Further, according to an embodiment of the present disclosure, the loss (traction loss) in cable traction is reduced, whereby the power transmission to the action bodies can be performed appropriately. Further, according to an embodiment of the present disclosure, while the vehicle is stopped or when the rider gets off the vehicle, the feet of the rider seated on the seat are allowed to easily land on the ground. On the other hand, while the vehicle is traveling at a relatively high speed, the thighs of the rider are lifted up, and the sitting pressure is distributed appropriately. Additionally, it is possible to confirm which mode is activated, the mode for changing the shape of the seated surface, or the mode for not changing the same. Further, according to an embodiment of the present disclosure, when the user causes the action bodies to act to change the shape of the seated surface of the seat, the user is allowed to adjust the amount of action of the action body so that a preferable shape can be obtained. Further, according to an embodiment of the present disclosure, when, for example, the outer layer member is fit, the operation can be performed efficiently. Further, according to an embodiment of the present disclosure, it is possible to suppress flapping of the action body while the action body is not acting, and the shape of the seated surface of the seat and the appearance of the seat can be maintained excellently. Further, according to an embodiment of the present disclosure, the outer layer member can be appropriately fit by the groove formed in the cushion member for fitting the outer layer member, and the action body can be caused to smoothly act. Further, according to an embodiment of the present disclosure, slack can be prevented from occurring to the outer layer member as the action body acts, and the appearance of the seat can be maintained excellently.

BRIEF DESCRIPTION OF DRAWINGS

Various embodiments of the present disclosure are illustrated in the drawings, in which:

FIG. 3 is a view of the seat according to one embodiment of the present disclosure, viewed from above.

DETAILED DESCRIPTION

Hereinafter, an embodiment of the present disclosure (hereinafter referred to as the present embodiment) is described with reference to the drawings. The seat device of the present disclosure is preferably installed on a vehicle that travels while being in contact with the ground, more specifically a motorcycle, a motor-tricycle, or the like. The present embodiment is described regarding the configuration and the action thereof, taking a seat device installed on a two-seater motorcycle (hereinafter referred to as a seat device S) as an example.

In the description below, the "front to back direction" corresponds to the front to back direction of a seating seat 1 to be described below, which is a direction that coincides with the travel direction of the motorcycle. Further, the "width direction" corresponds to the seat width direction (i.e., lateral width) of the seating seat 1, which is a direction that corresponds to the right to left direction when the motorcycle is viewed from the front face. Further, positions, motions, and the like of each equipment described below refer to those when the motorcycle is in an upright state (in a state of not being tilted in a right or left direction), unless particularly provided.

Figure 1:
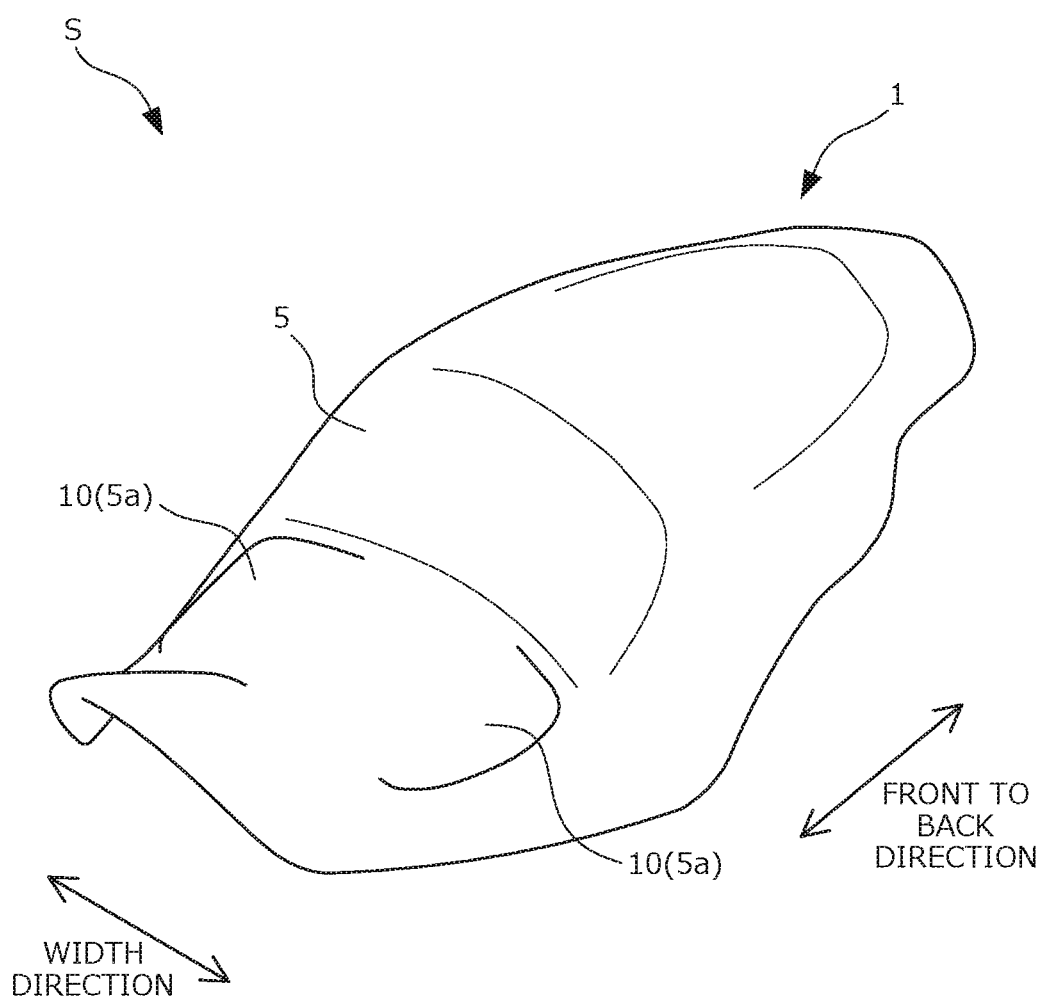
FIG. 1 is a perspective view illustrating a seat device according to one embodiment of the present disclosure.

The seat device S includes the seating seat 1 illustrated in FIG. 1. FIG. 1 is a perspective view illustrating the seat device S, in particular the seating seat 1, in which the width direction and the front to back direction are indicated by arrows. The seating seat 1 is one example of the seat, and is a saddle-form seat that a rider of the motorcycle straddles to be seated. This seating seat 1 is attached to a seat mounting part (not shown) of the motorcycle.

Further, the seating seat 1 according to the present embodiment is a two-seater seat configured so that riders can be seated at front end and rear end portions thereof. More specifically, a front seat is provided at the front end portion of the seating seat 1, and a rear seat is provided at a rear end portion of the seating seat 1. The rear seat is elevated relative to a rear edge of the front seat to be provided at a position higher than the front seat. Further, a step positioned between the front seat and the rear seat provides a backrest that supports the waist part of the rider seated on the front seat.

Figure 2:
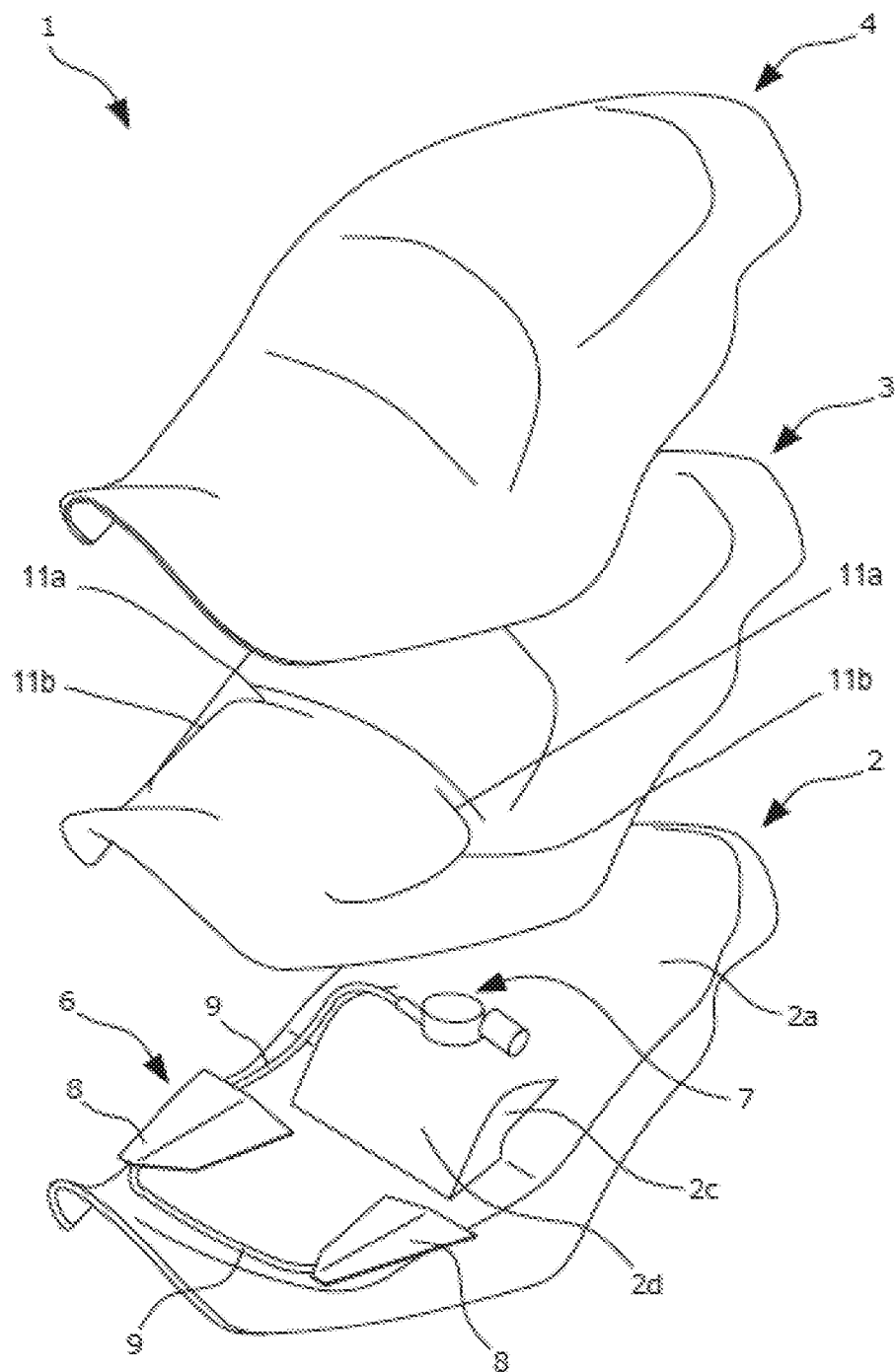
FIG. 2 is an exploded view illustrating a seat according to one embodiment of the present disclosure.

The basic configuration of the above-described seating seat 1 is common to a seat for a normal motorcycle. The seating seat 1, as illustrated in FIG. 2, is composed of a bottom plate 2 as a bottom plate formed with a synthetic resin or the like, a cushion member 3 made of a foamed material such as urethane, and an outer layer member 4 made of a PVC leather cloth or the like as constituent elements. FIG. 2 illustrates the seating seat 1 in a state in which the seating seat 1 is exploded into the respective constituent elements thereof. The cushion member 3 is installed on a top surface of the bottom plate 2 so that the bottom plate 2 supports the cushion member 3, and these are covered with the outer layer member 4 shaped into a predetermined shape. The end portions of the outer layer member 4 are fixed to back-side edge parts of the bottom plate 2. In this way, the seating seat 1 in the predetermined shape is formed.

In the present embodiment, among both of the end portions in the width direction of the seating seat 1, parts in contact with the thighs of the rider seated on the front seat are movable. In other words, the front seat of the seating seat 1 includes a pair of movable portions 10 at both of the end portions in the width direction. The pair of movable portions 10 are the parts indicated by hatching in FIG. 3, and move according to the traveling state of the motorcycle, or more specifically, according to the travel speed. FIG. 3 is a view of the seating seat 1 when viewed from above. In the same drawing, the rider's seated position is indicated by a dashed line, and the position of an actuator 7 to be described below is indicated by a dashed and dotted line.

Figure 4A:
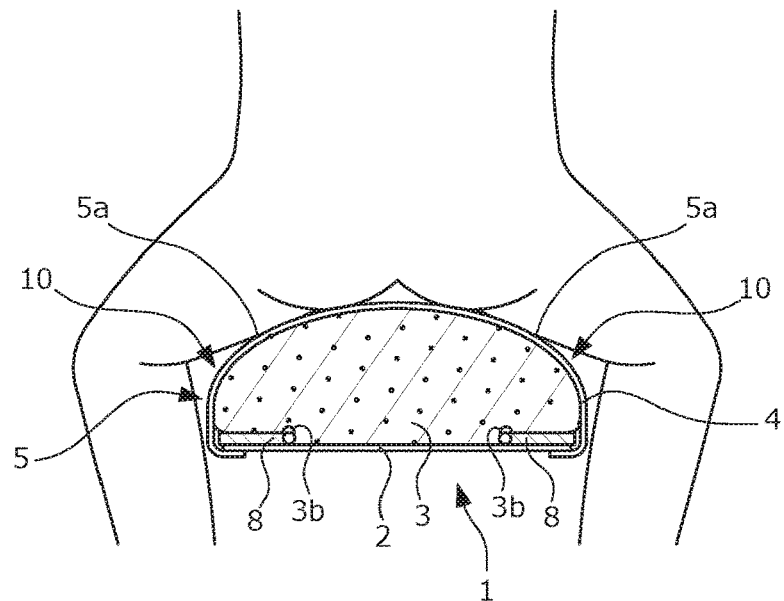
FIGS. 4A and 4B are explanatory views of an action of movable portions.
Figure 4B:
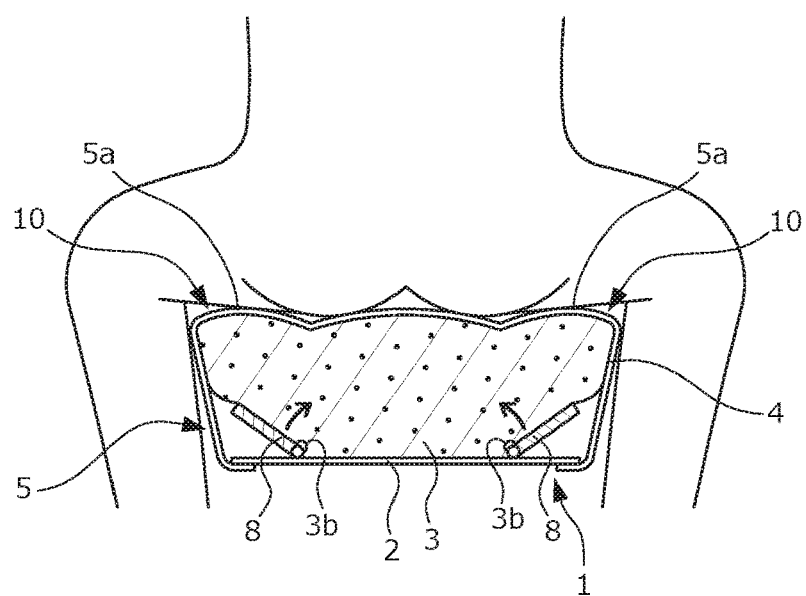

Hereinafter, the action of the movable portion 10 is described with reference to FIGS. 4A and 4B. FIGS. 4A and 4B are explanatory views for explaining the action of the movable portion 10; FIGS. 4A and 4B schematically illustrate cross sections of the seating seat 1 obtained by cutting the seating seat 1 along a plane having a normal line along the front to back direction, which illustrates a state of the seating seat 1 while the motorcycle is stopped (FIG. 4A) and a state while the motorcycle is traveling (FIG. 4B).

Regarding the movable portion 10, a top surface of the movable portion 10 forms a contact area 5a, which is an area in contact with the rider's thigh along an outer surface 5 of the seating seat 1. Besides, the movable portion 10 is capable of being displaced so that the contact area 5a comes close to or becomes separated from the rider's thigh.

While the motorcycle is stopped, the movable portion 10 is in a stowed state. When the movable portion 10 is in the stowed state, the seating seat 1 has a common seat shape, and an area where the movable portion 10 is located, in the outer surface 5 of the seating seat 1, that is, the above-described contact area 5a, is positioned at the stowed position. Here, the stowed position is equivalent to a first position of the present disclosure, which is a position at which the movable portion 10 is closest to the part of contact between the wheel of the motorcycle and the ground, in the range of movement of the contact area 5a. In other words, while the movable portion 10 is in the stowed state, the contact area 5a in the outer surface 5 of the seating seat 1 is positioned at the lowest position (on the ground side) in the range of movement thereof, and is curved, as illustrated in FIG. 4, in such a manner that it descends as it goes toward the width direction outer side.

On the other hand, when the travel speed of the motorcycle increases to be equal to or above a predetermined value (more specifically, to or above a threshold value for traveling that is described below), the movable portion 10 moves, and makes a transition from the stowed state to a deployed state. This causes the contact area 5a to turn around an edge thereof on the width direction inner side as a base point, thereby moving from the stowed position toward the deployed position. Here, the deployed position is equivalent to a second position of the present disclosure, which is a position at which the movable portion 10 is farthest from the part of contact between the wheel of the motorcycle and the ground, in the range of movement of the contact area 5a. In other words, while the movable portion 10 is in the deployed state, the contact area 5a in the outer surface 5 of the seating seat 1 is positioned at the highest position (on the side opposite to the ground) in the range of movement thereof.

As is described above, the movable portion 10 acts to make a transition from the stowed state to the deployed state (hereinafter this action is referred to as a deployment action), causing the contact area 5a to move from the stowed position to the deployed position. Then, at a point of time when the contact area 5a reaches the deployed position, the movable portion 10, as illustrated in FIG. 4, lifts up the rider's thigh and supports the same. In this way, the movable portion 10 lifting up the rider's thigh and supporting the same causes the area of contact between the seating seat 1 and the rider's buttocks to increase. This makes it possible to disperse a force (sitting pressure) that the rider exerts to the seating seat 1 during the traveling of the motorcycle, and as a result, makes it possible to reduce the burden on the rider (so-called tiredness from sitting).

Besides, when the speed of the motorcycle decreases and the travel speed becomes equal to or lower than a predetermined value (more specifically, equal to or lower than a threshold value for speed reduction, which is described below) while the movable portion 10 is in the deployed state, the movable portion 10 again moves, and returns from the deployed state to the stowed state. This causes the contact area 5a, having been at the deployed position, to turn around the edge thereof on the width direction inner side as the base point, thereby moving from the deployed position toward the stowed position. Then, in the present embodiment, the movable portion 10 acts so that the contact area 5a is positioned at the stowed position at the point of time when the motorcycle stops.

As is described above, the movable portion 10 acts to return from the deployed state to the stowed state (hereinafter this action is referred to as a stowage action), causing the contact area 5a to move from the deployed position to the stowed position, which results in that the state in which the movable portion 10 lifts up and supports the rider's thigh is canceled. In other words, when the contact area 5a returns to the stowed position, the rider's thigh, which has been lifted up, is caused to descend. This allows the rider's foot to more easily land on the ground when the motorcycle is stopped; in other words, this improves foot landing.

As described above so far, in the seating seat 1 according to the present embodiment, the movable portion 10 performs the deployment action and the stowage action according to the travel speed of the motorcycle, and accordingly, in the outer surface 5 of the seating seat 1, the contact area 5a in contact with the rider's thigh moves between the stowed position and the deployed position mentioned above. This makes it possible to disperse the sitting pressure that the rider exerts to the seating seat 1 while the motorcycle is traveling, and to secure the rider's foot landing when the motorcycle is stopped. In other words, the seating seat 1 according to the present embodiment achieves both the sitting pressure distribution during traveling and the foot landing upon stopping.

Further, at the point of time when the rider gets off the motorcycle, the movable portion 10 is in the stowed state, and when the movable portion 10 is in the stowed state, the seating seat 1 has the common seat shape, as described above. In this way, since the seating seat 1 has the common seat shape at the point of time when rider gets off, impairment of the appearance of the seat due to the provision of the movable portion 10 can be prevented excellently.

Next, the description below describes a characteristic configuration of the seat device S adopted for allowing the movable portion 10 to perform the above-described actions (that is, the deployment action and the stowage action). The seat device S includes a driving mechanism 6 for driving the movable portion 10, located inside the seating seat 1. The driving mechanism 6, as illustrated in FIG. 2, is attached to a top surface 2a of the bottom plate 2, which forms a bottom of the seating seat 1, that is, a support surface that supports the cushion member 3. In other words, the driving mechanism 6 is arranged between the bottom plate 2 and the cushion member 3 in a thickness direction of the seating seat 1.

Figure 5A:
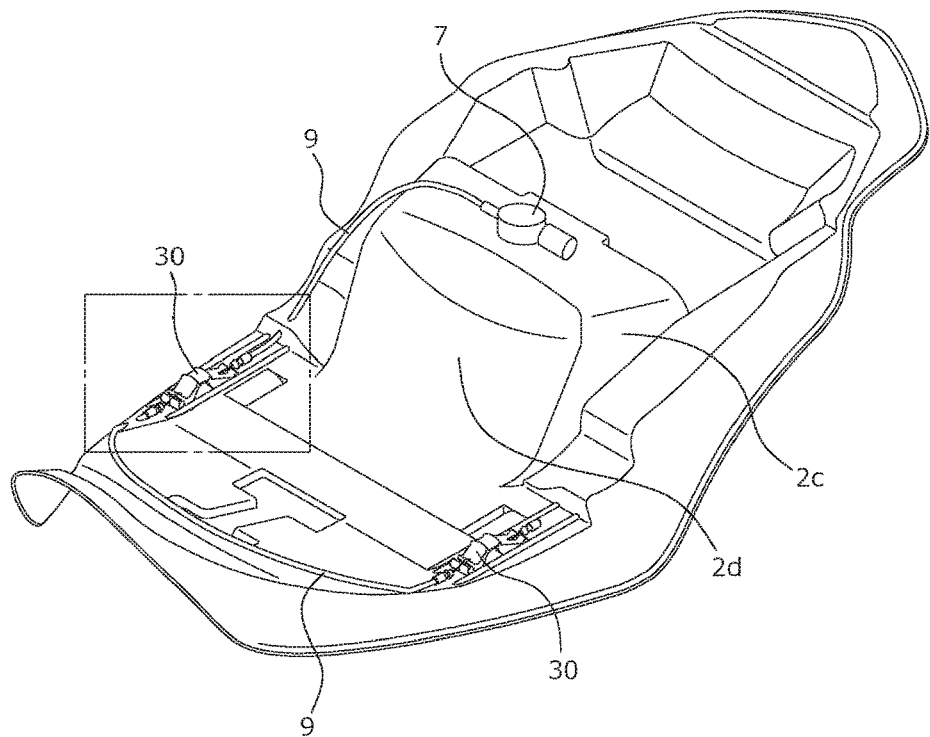
FIGS. 5A and 5B illustrate contact members and cables.
Figure 5B:
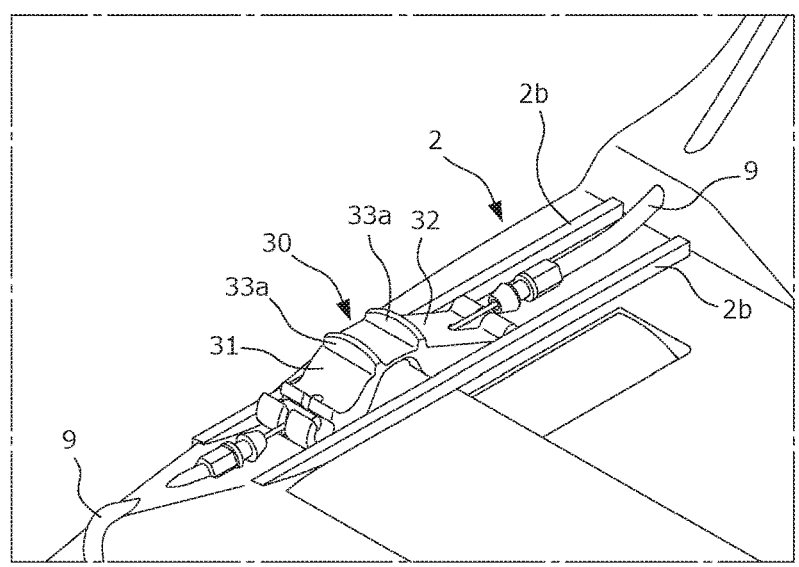

The description below describes the driving mechanism 6 in more detail. The driving mechanism 6 includes an actuator 7 as a power source illustrated in FIG. 2, and a turning plate 8 as an action body, and includes a contact member 30 and a cable 9 illustrated in FIGS. 5A and 5B. FIGS. 5A and 5B illustrate the contact member 30 and the cable 9, and FIG. 5A illustrates an entirety of the bottom plate 2 for indicating the positions of the contact member 30 and the cable 9, and FIG. 5B is an enlarged view illustrating the vicinities of the contact member 30.

The actuator 7 is equipment that imparts power to the turning plate 8. The actuator 7 pulls the cable 9 or delivers the same to cause the contact member 30 to act, thereby imparting rotation power to the turning plate 8 in contact with the contact member 30. More specifically, the power from the actuator 7 is transmitted to the turning plate 8 by the cable 9 as a power transmission body; more specifically, for transmission of the power, the cable 9 slides along the direction in which the cable 9 extends, thereby deforming the contact member 30, whereby the power is transmitted to the turning plate 8.

Figure 6:
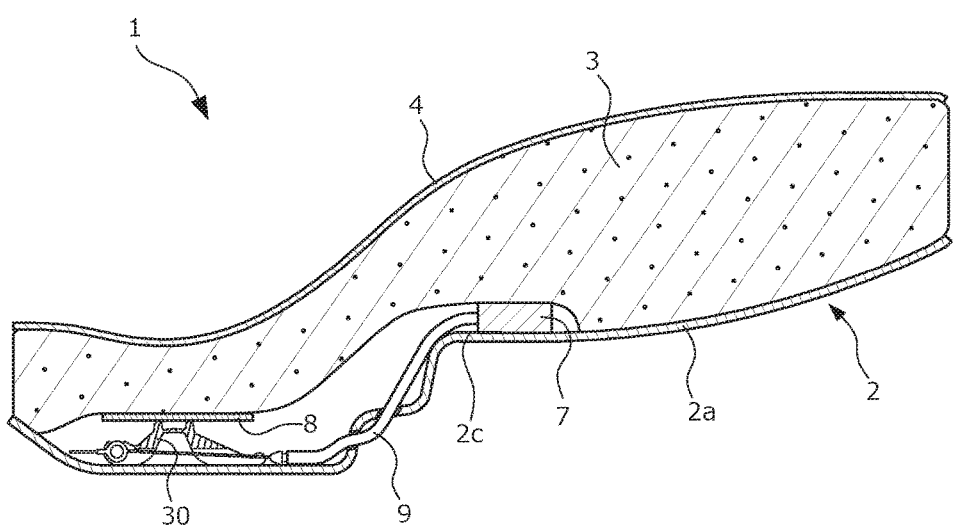
FIG. 6 is an explanatory view illustrating a position at which a driving mechanism is arranged.

In the present embodiment, the actuator 7, as illustrated in FIG. 6, is fixed on the top surface 2a of the bottom plate 2. FIG. 6 is an explanatory view illustrating the position at which the driving mechanism 6 is arranged, which is a schematic diagram illustrating a cross section of the seating seat 1 cut along a plane having a normal line along the width direction. By fixing the actuator 7 to the top surface 2a of the bottom plate 2, interference is prevented from occurring between the actuator 7 and equipment arranged directly under the bottom plate 2, for example, equipment arranged around the seat mounting part of the motorcycle.

Further, the actuator 7 is arranged between seated positions of the front seat and the rear seat of the seat 1 in the front to back direction of the seating seat 1. In this way, by arranging the actuator 7 between the seated positions of the front seat and the rear seat of the seating seat 1, the rider is prevented from sitting on a part where the actuator 7 is arranged in the seating seat 1. This excellently prevents the rider's sitting feeling (sitting comfort) from being impaired.

Further, the actuator 7 is arranged in a center part in the front to back direction of the top surface 2a of the bottom plate 2, to be positioned in a width direction center part thereof. This is because it is easier to secure a space for the actuator 7 in the width direction center part, than in an end portion in a width direction. In other words, in the present embodiment, by arranging the actuator 7 in the width direction center part of the top surface 2a of the bottom plate 2, the operation for attaching the actuator 7 is made easier.

Regarding the shape of the bottom plate 2, the bottom plate 2 has a shape corresponding to an outer shape of the seating seat 1. The front end portion of the bottom plate 2 has a shape corresponding to that of the front seat, and the top surface 2a thereof is extended in the front to back direction, as illustrated in FIG. 2. The rear end portion of the bottom plate 2 has a shape corresponding to that of the rear seat, and the top surface 2a thereof is an inclined surface that gradually descends toward the front end portion of the bottom plate 2, as illustrated in FIG. 2.

Figure 12:
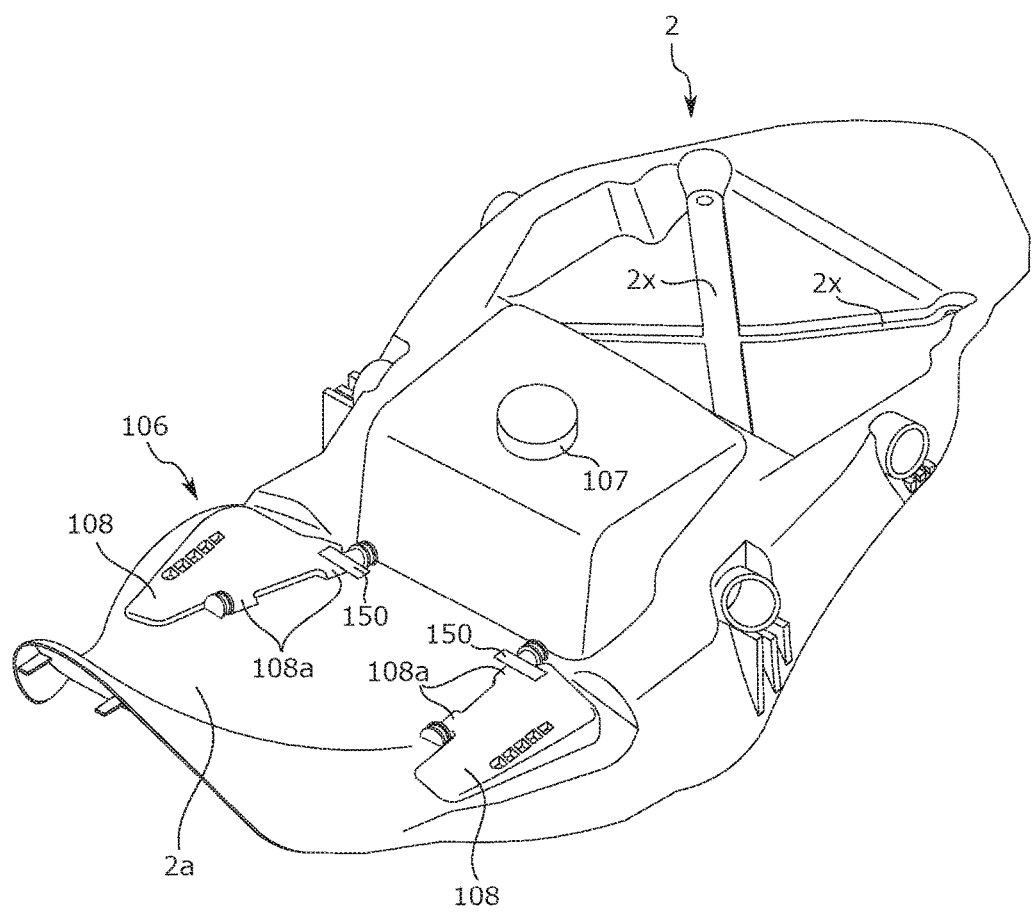
FIG. 12 illustrates a modification example of the driving mechanism.

The front end and rear end portions of the top surface 2a of the bottom plate 2 may be approximately flat surfaces, or alternatively, multi-step surfaces having steps appropriately so that the shapes thereof match the buttocks of the riders. Further, as illustrated in FIG. 12 to be described below, in at least one of the front end and rear end portions of the top surface 2a of the bottom plate 2 (in FIG. 12, the top surface 2a at the rear end portion), two recessed portions 2x, which are formed in a X-letter shape, may be provided. The recessed portions 2x are, for example, rectangular grooves, which may be extended or elongated in predetermined directions. The provision of such recessed portions 2x makes it possible to reduce weight of the bottom plate 2, and to increase rigidity in the vicinities of the area where the recessed portions 2x are formed.

Further, in the center part in the front to back direction of the bottom plate 2, as illustrated in FIG. 2, the width direction center part thereof relatively bulges ahead with respect to both of the end portions in the width direction, thereby forming a bulge portion 2c. A front surface 2d of this bulge portion 2c extends in such a manner that the front surface 2d connects the top surface 2a of the front end portion of the bottom plate 2 and the top surface 2a of the rear end portion of the same. In particular, in the front surface 2d of the bulge portion 2c, a range thereof closer to the rear end portion of the bottom plate 2 forms, as illustrated in FIG. 2, a surface parallel to the front to back direction (horizontal surface), and the actuator 7 is installed on this horizontal surface. In this way, in the front surface 2d of the bulge portion 2c, in the range thereof forming the horizontal surface, the actuator 7 is installed, whereby the space for installing the actuator 7 can be secured easily, which makes the operation for attaching the actuator 7 further easier.

Still further, in the front end portion of the bottom plate 2, in both of the end portions in the width direction, the contact members 30, which are described below, are mounted. The parts where the contact members 30 are mounted, in the top surface 2a of the bottom plate 2, are flat surfaces. Still further, as illustrated in FIG. 5B, in the top surface 2a of the bottom plate, at positions in the width direction between which the contact members 30 are interposed, projection-form guide portions 2b are provided along the front to back direction. The provision of such guide portions 2b makes it possible to increase the rigidity of the bottom plate 2, in particular, the rigidity in the vicinities of the areas where the contact members 30 are arranged (in other words, areas around the turning plates 8).

The turning plate 8 is a plate member made of a metal or a resin, which turns to drive the movable portion 10; a pair of the turning plates 8 are provided to correspond to the movable portions 10, as illustrated in FIG. 2. The pair of the turning plates 8 are attached to the top surface 2a of the front end portion of the bottom plate 2, with a distance therebetween in the width direction. The turning plates 8 are arranged below the corresponding movable portions 10, respectively. In other words, each turning plate 8 is positioned below the rider's thigh when the rider is seated on the front seat of the seating seat 1, and further, in a state of being interposed between the bottom plate 2 and the cushion member 3 in the thickness direction of the seating seat 1, as illustrated in FIG. 6.

The turning plate 8 is in a blade (flap) shape, and in an outer edge of the turning plate 8, an edge part positioned on the width direction outer side is formed in a bent line form in a lateral-V-letter shape, and an edge part positioned on the width direction inner side is formed in a straight line shape. The turning plate 8 is attached to the top surface 2a of the bottom plate 2, in an orientation such that the edge thereof on the width direction inner side, formed in the straight line shape, is slightly inclined in the front to back direction.

Then, when receiving power via the cable 9 from the actuator 7, the turning plate 8 turns, around the edge thereof on the width direction inner side as a base point, in such a manner that the edge thereof on the width direction outer side ascends or descends. When movable portion 10 performs the deployment action, the turning plate 8 performs such a turning action that the edge thereof on the width direction outer side ascends (hereinafter this action is referred to as an opening action), with the power imparted by the actuator 7. On the other hand, when the movable portion 10 performs the stowage action, the turning plate 8 performs such a turning action that the edge thereof on the width direction outer side descends (hereinafter this turning action is referred to as a closing action).

The contact member 30 is a member in a rectangular piece form, and is provided for each turning plate 8. To put it more concretely, one contact member 30 is provided for each turning plate 8, as illustrated in FIGS. 5A and 5B. Each contact member 30 is arranged at a position between the turning plate 8 and the bottom plate 2, in such a state that the long side thereof is directed in the front to back direction. Further, each contact member 30 is in a state of being in contact with the back surface of the turning plate 8, in an intermediate portion 33 in the front to back direction. Here, the intermediate portion 33 is a portion of the contact member 30, positioned between a front end portion (equivalent to "one end portion") 31 and a rear end portion (equivalent to "the other end portion") 32. On the top surface of the intermediate portion 33, rib-shaped elevated portions 33a, elevated toward the turning plate 8, are formed, and these elevated portions 33a are in contact with the back surface of the turning plate 8.

Figure 7A:
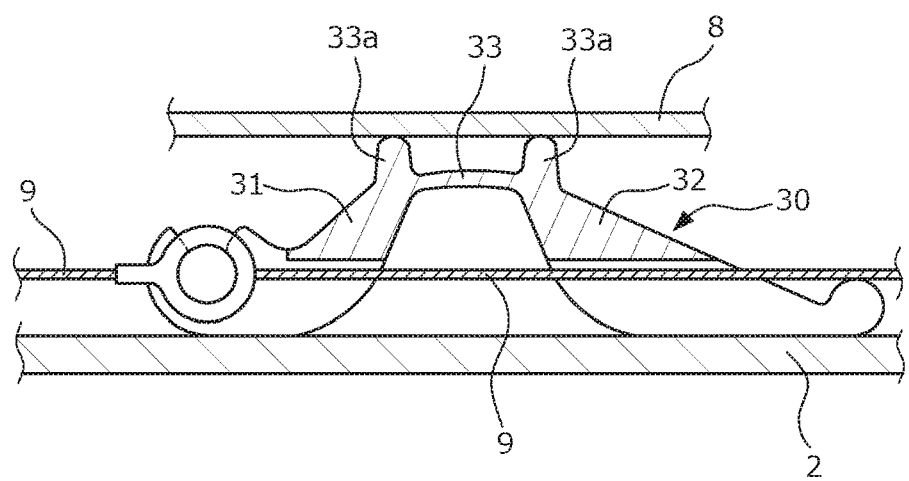
FIGS. 7A and 7B are explanatory views of an action of a contact member.
Figure 7B:
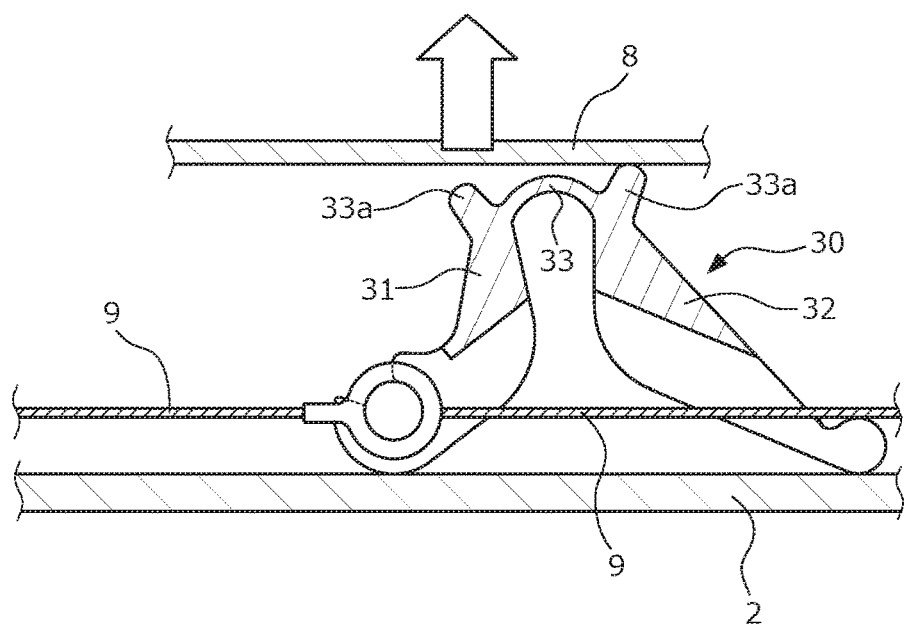

The contact member 30 acts for turning the turning plate 8. Specifically, while the rear end portion 32 of the contact member 30 is fixed to the bottom plate 2, the front end portion 31 of the contact member 30 is movable in the front to back direction along the top surface 2a of the bottom plate 2. In other words, the contact member 30 is configured so that the front end portion 31 is movable forward/backward with respect to the rear end portion 32. When the front end portion 31 of the contact member 30 moves toward the rear end portion 32 thereof, as illustrated in FIGS. 7A and 7B, the intermediate portion 33 is bent and deformed to protrude upward (toward the side where the turning plate 8 is positioned). FIGS. 7A and 7B are explanatory views illustrating an action of the contact member 30; FIG. 7A illustrates a state during standby, and FIG. 7B illustrates a state during the action.

As the amount of protrusion of the intermediate portion 33 gradually increases in response to the bending deformation of the contact member 30 as described above, the intermediate portion 33 of the contact member 30 in contact with the turning plate 8 accordingly pushes up the turning plate 8. Consequently, the turning plate 8 is caused to perform the opening action. On the other hand, as the front end portion 31 is separated from the rear end portion 32, which causes the contact member 30 to recover from the bending state to the original state, the amount of protrusion of the intermediate portion 33 gradually decreases, which consequently causes the turning plate 8 to perform the closing action.

It should be noted that, as described above, the guide portions 2b projecting from the top surface 2a of the bottom plate 2 are provided, at such positions that the contact member 30 is interposed in the width direction between the guide portions 2b. Each guide portion 2b, as illustrated in FIG. 5B, is formed along the front to back direction, which is the direction along which the front end portion 31 of the contact member 30 moves. The front end portion 31 therefore moves back and forth while being guided by the guide portions 2b, thereby approaching and being separated from the rear end portion 32 appropriately.

The cable 9 is a member that transmits the power imparted by the actuator 7 to the turning plate 8, and effectively links the actuator 7 and the contact member 30 with each other. The cable 9 is provided for each of the contact members 30. As illustrated in FIGS. 7A, 7B, and the like, one of the cables 9 is extended from the actuator 7, and a leading end portion of this cable 9 is engaged with the front end portion 31 of the one of contact member 30. Further, as illustrated in FIGS. 7A, 7B, and the like, a distal end portion of another cable 9 is connected to the leading end portion of the foregoing cable 9. Still further, the leading end portion of the other cable 9 is engaged with the front end portion 31 of the other contact member 30.

Each cable 9 is pulled or delivered by the power imparted from the actuator 7. The actuator 7 has a reel (not shown) and one of the cables 9 is wound around this reel. When the actuator 7 rotates the above-described reel, thereby winding the cable 9 up, the cable 9 is pulled. Here, together with the cable 9 directly pulled by the reel, the other cable 9 connected with the foregoing cable 9 is also pulled. When each cable 9 is pulled in this way, the front end portion 31 of the contact member 30 with which the leading end portion of the cable 9 is engaged moves toward the rear end portion 32. This causes the contact member 30 to push the turning plate 8 up, which consequently causes the turning plate 8 to perform the opening action. Through the procedure as described above, the power from the actuator 7 is transmitted via the cables 9 and the contact member 30 to each turning plate 8.

The cables 9 are laid between the bottom plate 2 and the cushion member 3 in the thickness direction of the seating seat 1, and in the present embodiment particularly, as illustrated in FIG. 6, they are laid along the top surface 2a of the bottom plate 2.

Basically, it is usual that the route for laying the cables 9 is a route that connects the actuator 7 and the contact member 30 at the shortest distance so that the length in which the cables are laid is shorter. In a case where such a route is used, however, a relatively large clearance is formed between the cushion member 3 and the bottom plate 2 in order to secure a space for the route, and this clearance causes the cushion member 3 (in a strict sense, the part positioned above the cable 9) to be thinner. Such thinning of the cushion member 3 possibly reduces the cushioning properties of the seating seat 1. In contrast, in a case where the cables 9 are laid along the top surface 2a of the bottom plate 2 as in the present embodiment, no large clearance is formed between the cushion member 3 and the bottom plate 2, and the thickness of the cushion member 3 is by no means reduced. The cushion member 3 consequently is mounted on the seating seat 1, having an original thickness. As a result, this makes it possible to allow the cushion member 3 to exhibit its own functionality, thereby allowing the cushioning properties of the seating seat 1 to be sufficiently ensured.

In the present embodiment, since two cables 9 are connected to be handled as one cable 9, the number of the cables 9 extended from the actuator 7 can be set to one. Further, regarding the cable 9 directly connected to the actuator 7, the part thereof extended toward the front end portion 31 of the contact member 30 is extended in the front to back direction. This makes it possible that, when the front end portion 31 of the contact member 30 is moved by pulling the cable 9, the tensile force can be smoothly transmitted from the cable 9 to the front end portion 31 of the contact member 30.

Figure 8:
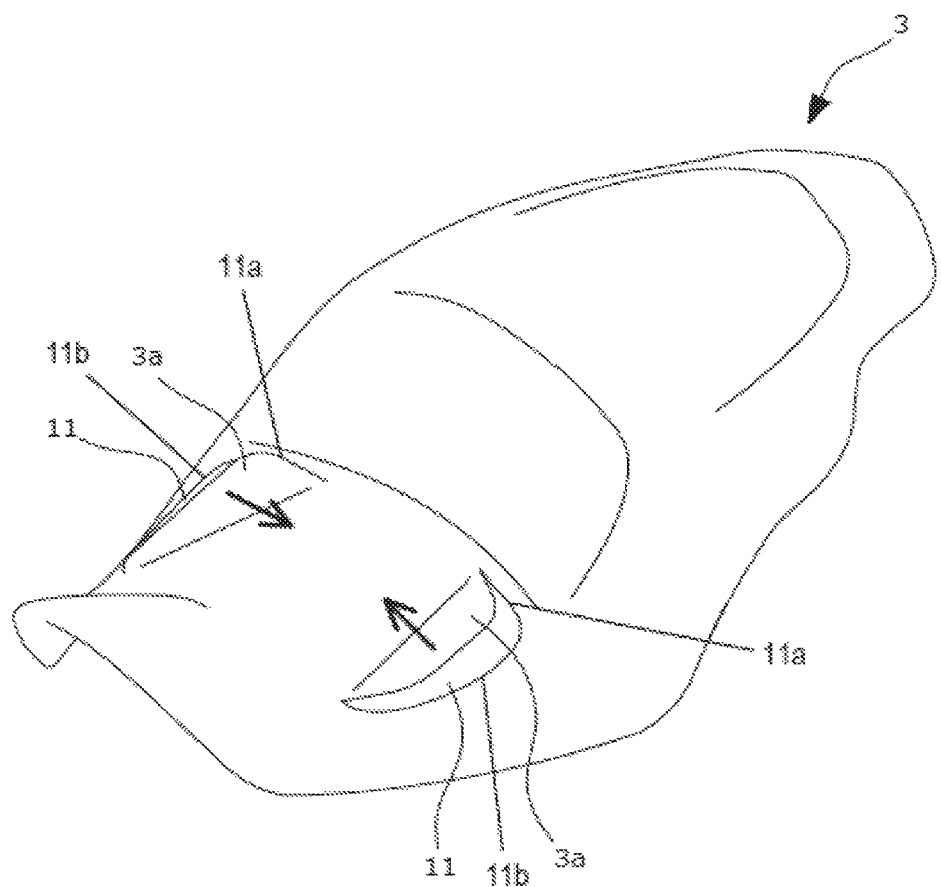
FIG. 8 is a perspective view illustrating a cushion member.

With the driving mechanism 6 formed with the equipment described above (e.g., the actuator 7, the turning plate 8, the cables 9, and contact member 30), the deployment action and the stowage action of the movable portion 10 are implemented. Here, regarding the configuration of the movable portion 10, the movable portion 10 includes a turning part 3a provided at the front end portion of the cushion member 3, illustrated in FIG. 8, and the outer layer member 4 covering the turning part 3a. FIG. 8 is a perspective view of the cushion member 3, and this drawing illustrates a state in which the turning part 3a is turned upward.

The turning part 3a is positioned at a position immediately above the turning plate 8 in the cushion member 3, so that the turning plate 8 is interposed between the turning part 3a and the bottom plate 2. The lower surface of this turning part 3a is in contact with the turning plate 8, and as the turning plate 8 is turned, the turning part 3a also is similarly turned. When the turning plate 8 is turned, the turning part 3a is turned around the edge thereof on the width direction inner side as a base point, and when, for example, the turning plate 8 performs the opening action, the turning part 3a is turned in such a manner that the edge thereof on the width direction outer side ascends.

To be more specific about the turning part 3a, a pair of the turning parts 3a are formed in the front end portion of the cushion member 3. The positions at which the turning parts 3a are formed are separated from each other in the width direction, and are slightly inward as compared with the side edges of the front end portion of the cushion member 3. As is the case with the turning plate 8, the turning part 3a is formed in a blade (flap) shape, and in an outer edge of the turning plate 8, an edge part positioned on the width direction outer side is formed in a bent line form in a lateral-V-letter shape. On the other hand, in the outer edge of the turning plate 8, an edge part positioned on the width direction inner side is formed in a straight line shape, and forms a base point around which the turning part 3a turns (that is, a folding base point).

Further, the turning part 3a is formed integrally with a part of the cushion member 3 other than the turning part 3a, that is, a non-turning part. At the outer edge of the turning part 3*a*, in other words, at a position of a boundary between the turning part 3*a* and the non-turning part, a slit 11 is formed as a notch. This slit 11 is configured to allow the turning part 3*a* to smoothly turn, and is formed along the outer edge of the turning part 3*a*. The slit 11 is formed along the entirety of the turning part 3*a* except for the part on the inner side in the width direction, which forms the base point upon turning, and is bent in an approximately lateral-V-letter shape.

With the above-described slit 11 formed at the position of the boundary between the turning part 3*a* and the non-turning part, the amount of turning when the turning part 3*a* turns increases, as compared with the case where the above-described slit 11 is not formed. This makes it possible to sufficiently secure the amount of movement of the contact area 5*a* when the movable portion 10 makes a transition from the stowed state to the deployed state whereby the contact area 5*a* moves. As a result, when the movable portion 10 is shifted to the deployed state thereby lifting up and supporting the rider's thigh, the contact area 5*a* becomes in contact with the rider's thigh in a wider area, whereby the effect of distributing the sitting pressure can be exhibited still further excellently.

As is described above, in the present embodiment, the above-described slit 11 formed in the cushion member 3 functions as an interlocking property improving portion, which is intended to improve the interlocking property when the movable portion 10 turns following the turning action of the turning plate 8. In other words, the turning part 3*a* of the cushion member 3 is allowed to excellently follow the action of the turning plate 8 due to the slit 11 formed as the interlocking property improving portion. With this configuration, regarding the amount of displacement of the movable portion 10, a sufficient amount can be secured that allows the movable portion 10 to lift up and support the rider's thigh while the contact area 5*a* is in a state of being positioned at the deployed position, and further, the amount of action of the turning plate 8 can be controlled, thereby being easily adjusted.

It should be noted that, when the seating seat 1 is viewed from above, in the end portions in the width direction of the seating seat 1, parts surrounded by the slits 11 correspond to the movable portions 10. In other words, in each of the end portions in the width direction of the seating seat 1, the slit 11 forms a boundary between the movable portion 10 and the other part.

Further, in the present embodiment, the above-described slit 11 is formed along the V-letter-shaped bent part positioned on the outer edge, in particular, on the width direction outer side, of the turning plate 8. In this way, with the slit 11 formed along the outer edge part of the turning plate 8, the outer edge of the turning part 3*a* easily comes into contact with the outer edge part of the turning plate 8, which allows the turning plate 8 to more easily move (turn) the turning part 3*a*. As a result, this makes it further easier to secure the amount of turning of the turning part 3*a*, thereby allowing the effect of distributing the sitting pressure to be exhibited further more excellently.

Further, in the present embodiment, the above-described actuator 7 is arranged at such a position in the width direction that the slit 11 is avoided. The actuator 7 is positioned on the width direction inner side with respect to the position at which the slit 11 is formed; in other words, it is positioned between the pair of slits 11. In this way, as the actuator 7 is separated from the slits 11, the effect exhibited by the slits 11, that is, the effect of allowing the turning parts 3*a* of the cushion member 3 to be turned easily, can be exhibited excellently, without being hindered by the actuator 7.

On the back surface of the cushion member 3, that is, the surface thereof opposed to the bottom plate 2, in width direction inner side parts (parts that function as base points upon turning) of the outer edges of the turning parts 3*a*, cavities 3*b* in a semi-cylindrical shape each are formed, as illustrated in FIG. 4. As the cavities 3*b* are formed on the back surfaces of parts that function as the base points upon turning, the turning parts 3*a* are further more easily deformed, which results in that the effect of distributing the sitting pressure is exhibited further excellently.

Figure 9:
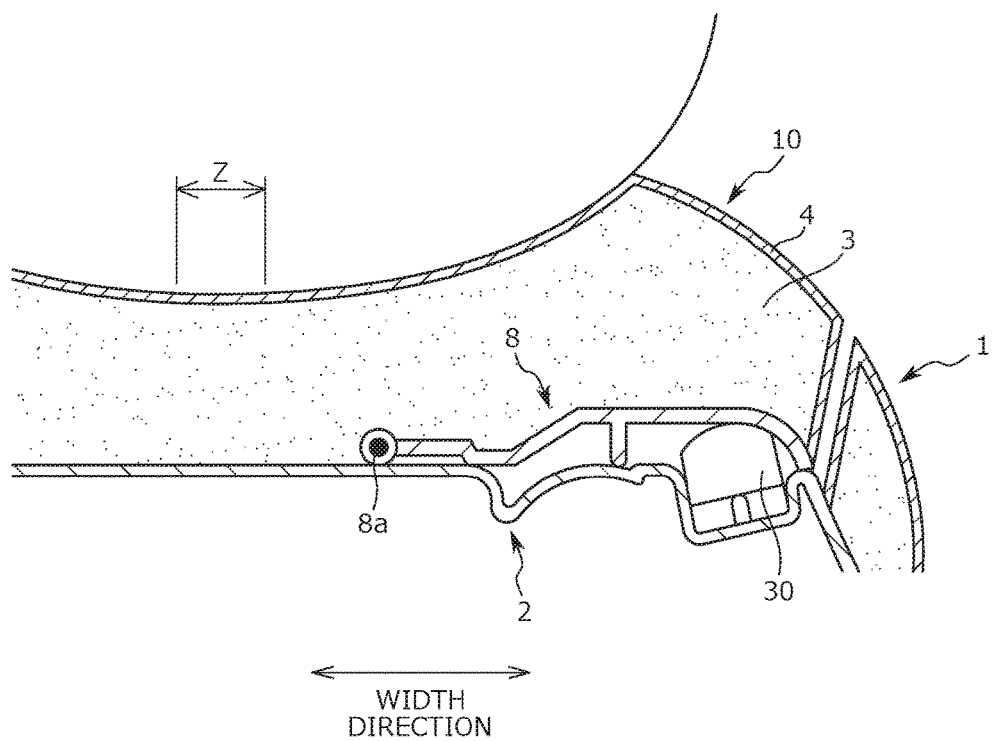
FIG. 9 is a schematic cross-sectional view illustrating the position relationship between the rider's ischium and the action body.

Further, in the present embodiment, the turning plate 8 is configured to turn around a turning axis 8*a* arranged on one edge side in the width direction. Besides, in a state in which the rider is seated on the seating seat 1, the positions in the width direction at which the turning plate 8 and the turning axis 8*a* are arranged are outside the range where the rider's ischium is present. This makes it possible to distribute the sitting pressure in the vicinities of the ischium. The description below describes this effect, while referring to FIG. 9. FIG. 9 is a schematic cross-sectional view illustrating the position relationship between the rider's ischium and the turning plate 8.

When the rider is seated on the seating seat 1, the rider's buttocks are placed on the cushion member 3, thereby causing the cushion 3 to be warped (distorted). Here, as illustrated in FIG. 9, the amount of the warp is maximized at a position where the ischium is placed, among the part where the rider's buttocks are placed. On the other hand, the turning plate 8 and the turning axis 8*a* thereof are arranged outside the range in the width direction where the rider's ischium is present (the range indicated by the sign "Z" in FIG. 9), more specifically, on the width direction outer side with respect to the range Z. This positional relationship allows the turning plate 8 to appropriately turn without giving discomfort to the rider. Further, as the turning plate 8 turns at a position outside the range Z, when the seated surface is deformed due to the turn of the turning plate 8, the area where the seated surface and the rider's thigh are in contact with each other increases. As a result, the sitting pressure in the vicinities of the ischium is distributed more evenly, which makes it possible to reduce the load applied to the rider's buttocks when the sitting pressure in the vicinities of the ischium increases.

Figure 10:
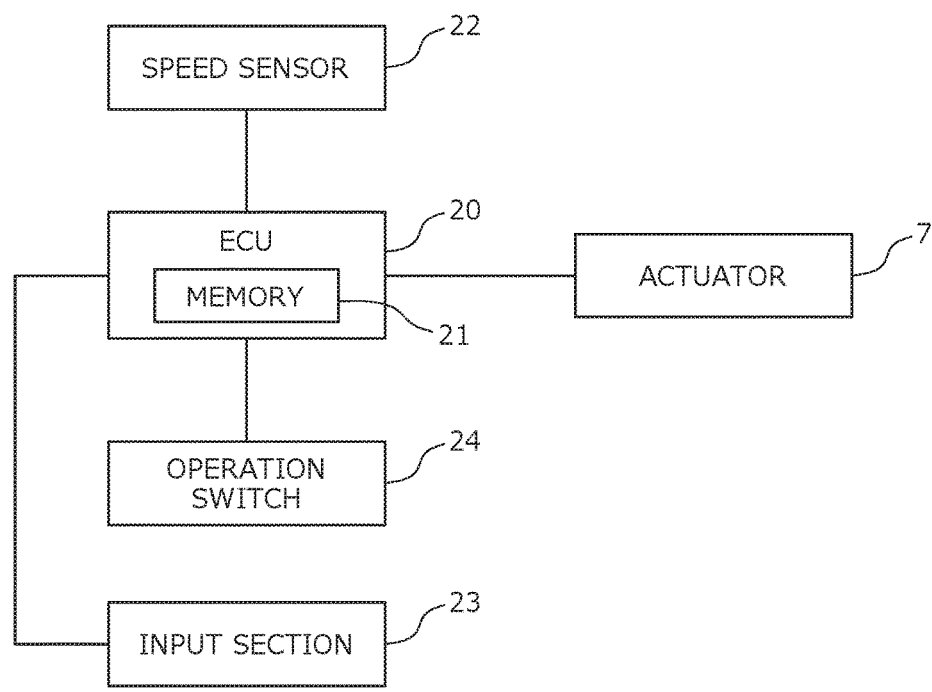
FIG. 10 is a block diagram illustrating the seat device according to one embodiment of the present disclosure, from the viewpoint of the control of the same.

Next, the description below describes the configuration for executing the action of the movable portion 10 according to the traveling state of the motorcycle, while referring to FIG. 10. FIG. 10 is a block diagram illustrating the configuration of the seat device S from the viewpoint of control. The seat device S, as illustrated in FIG. 10, includes an electronic control unit (ECU) 20 as a controlling device for controlling the above-described driving mechanism 6. This ECU 20 is provided in a main body of the motorcycle, and is intended to automatically control the state of the movable portion 10 according to the travel speed of the motorcycle. The ECU 20 controls the actuator 7 according to the travel speed of the motorcycle. This allows the pair of the turning plates 8 to perform the closing action or the opening action as an action corresponding to the travel speed. As a result, the movable portion 10, when the travel speed increases to or above a predetermined speed, starts the deployment action, and when the travel speed decreases to or below a predetermined speed, starts the stowage action.

In other words, the seat device S monitors the travel speed of the motorcycle, and more specifically, includes a speed sensor 22 as a speed detection unit. The speed sensor 22, when detecting the travel speed, outputs a signal corresponding to the detection result. The ECU 20, when receiving the signal output from the speed sensor 22, identifies the detection result of the speed sensor 22 (i.e., the travel speed of the motorcycle) from the signal.

After the travel speed detected by the speed sensor 22 is identified, the ECU 20 compares the travel speed with a threshold value stored in a memory 21 of the ECU 20. Here, two types of threshold values are stored in the memory 21, one of which is a threshold value used when it is determined whether the deployment action is executed or not, that is, a threshold value for traveling. Another threshold value is a threshold value used when it is determined whether the stowage action is executed or not, that is, a threshold value for speed reduction. Both of these two threshold values are predetermined values; for example, the threshold value for traveling is set in a range of 70 to 90 kilometers per hour, and particularly in the present embodiment, it is set at 80 kilometers per hour. Further, the threshold value for speed reduction is set in a range of 30 to 50 kilometers per hour, and particularly in the present embodiment, it is set at 40 kilometers per hour. It should be noted that the threshold value for traveling and the threshold value for speed reduction are not limited to the above-described values, and can be set to alternate values.

Further, in the present embodiment, each threshold value stored in the memory 21 can be changed at a later time. An input section 23 composed of a switch, a lever, or the like is provided at a predetermined position on the motorcycle, and when the input section 23 receives a threshold value changing operation by the rider, the ECU 20 overwrites and updates the threshold value stored in the memory 21 to a new threshold value. If the threshold value can be changed in this way, the control conditions are set to suit the user's (rider's) preferences.

Then, the ECU 20 compares the travel speed with each threshold value, and when the predetermined conditions are satisfied, the ECU 20 controls the actuator 7 to switch the state of the movable portion 10. When the motorcycle makes a transition from the stopped state to the traveling state and the travel speed increases to or above the threshold value for traveling, the ECU 20 controls the actuator 7 so that the movable portions 10 start the deployment action. This causes the contact areas 5a in the outer surface 5 of the seating seat 1 to start moving from the stowed positions toward the deployed positions. At the point of time when the contact areas 5a reach the deployed positions, the ECU 20 stops the actuator 7. At this point, the thighs of the rider seated on the front seat are supported in a state of being lifted up by the movable portions 10. As a result, during the traveling of the motorcycle, the sitting pressure applied by the rider to the seating seat 1 is suitably distributed.

On the other hand, when the motorcycle slows down and the travel speed decreases to or below the threshold value for speed reduction, the ECU 20 controls the actuator 7 so that the movable portions 10 start the stowage action. This allows the contact areas 5a to move from the deployed positions toward the stowed positions. It should be noted that, in the present embodiment, at the point of time when the travel speed decreases to the predetermined speed, or in a strict sense, at the point of time when the motorcycle stops, the ECU 20 controls the actuator 7 so that the contact areas 5a reach the stowed positions. As a result, the rider's thighs, which are being lifted up by the movable portions 10 while the motorcycle is traveling, are descended gradually according to the degree of the speed reduction, and when the motorcycle is stopped, the rider's feet are allowed to land on the ground.

Incidentally, the seat device S, as illustrated in FIG. 10, further includes an operation switch 24 operated by the rider. The operation switch 24 is an exemplary switch provided on an operation panel (not shown) provided on the motorcycle, which is optionally turned on/off.

According to the turning on/off of the operation switch 24, the presence/absence of control of the actuator 7 by the ECU 20 is switched. In an embodiment, only when the operation switch 24 is in an ON state, the ECU 20 automatically controls the actuator 7 so that the position of the contact area 5a is switched according to the travel speed detected by the speed sensor 22. More specifically, the automatic adjustment of the position of the contact area 5a via the ECU 20 is executed only when the operation switch 24 is in an ON state, and it is not executed when the operation switch 24 is in an OFF state. As the presence/absence of control by the ECU 20 is optionally switchable according to the operation by the operation switch 24 in this way, the user (rider) is allowed to set the presence/absence of the position adjustment of the contact area 5a on his/her own will. Then, as the position adjustment of the contact area 5a is executed exclusively when the operation switch 24 is in an ON state, it is possible to check whether the mode at that point of time is a mode "with adjustment" or a mode "without adjustment".

Procedure of Processing Relating to Contact Area Position Adjustment

Figure 11:
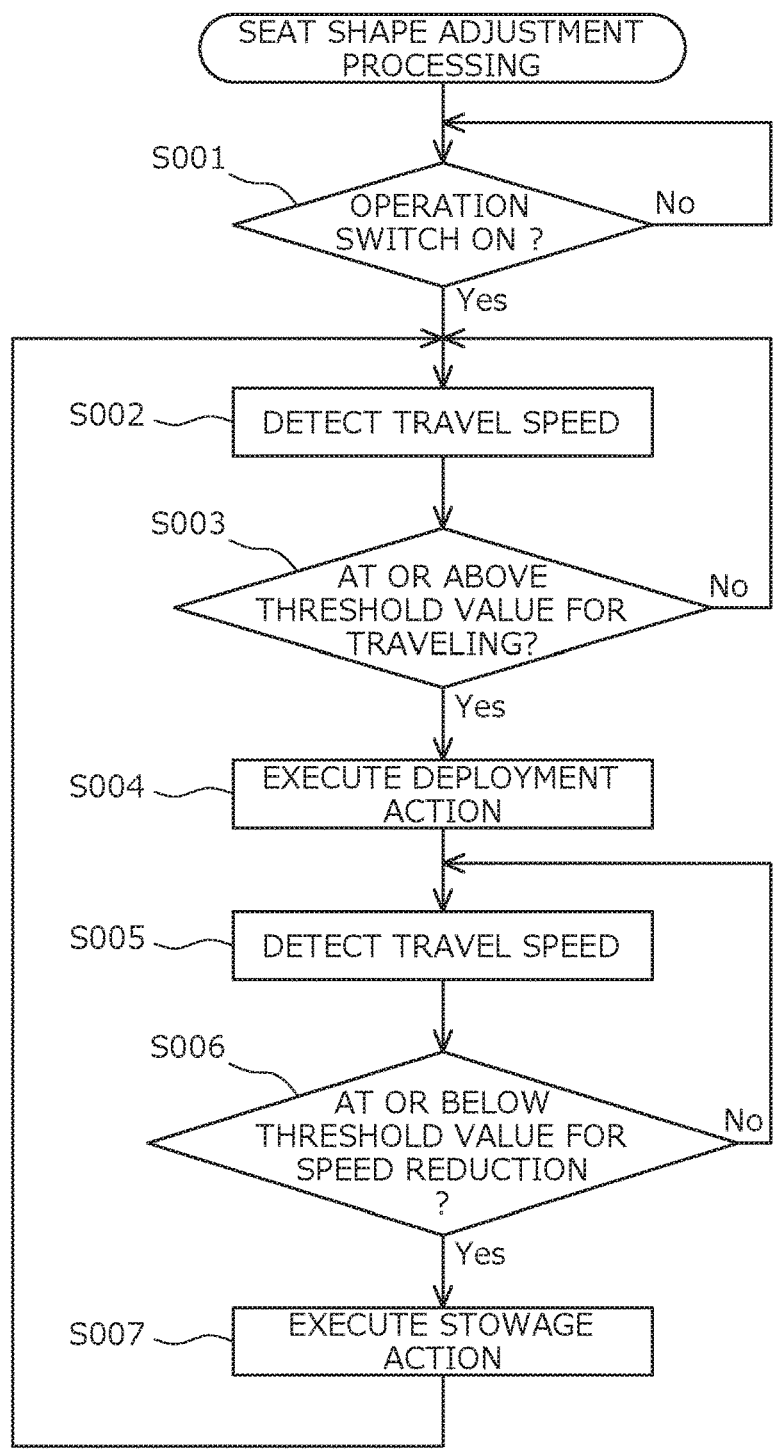
FIG. 11 illustrates a procedure of a processing operation for adjusting the seat shape according to the travel speed of a vehicle, according to an embodiment.

Next, regarding the processing for adjustment of the position of the contact area 5a according to the travel speed of the motorcycle (hereinafter this processing is referred to as "seat shape adjustment"), the procedure of the processing is described with reference to FIG. 11. FIG. 11 illustrates the procedure of the seat shape adjustment. The seat shape adjustment starts in response to the switching of the operation switch 24 from an OFF state to an ON state as a trigger, as illustrated in FIG. 11 (S001). This switching operation is executed, typically, at the point of time when the rider gets on the motorcycle and is seated on the front seat of the seating seat 1. It should be noted that at the point of time when the step S001 is executed, the movable portion 10 is in the stowed state, that is, the contact area 5a in the outer surface 5 of the seating seat 1 is in the stowed position, whereby the rider's foot is allowed to land on the ground easily.

When the seat shape adjustment is started, from then on, the monitoring of the travel speed of the motorcycle, and the adjustment of the position of the contact area 5a according to the travel speed, are executed at any time. As the motorcycle starts traveling and the travel speed gradually increases, the speed sensor 22 detects the travel speed on a regular basis, and a signal indicating the detection result is output (S002). On the other hand, the ECU 20 identifies a travel speed based on an output signal received from the speed sensor 22, reads the threshold value for traveling, stored in the memory 21, and determines whether or not the identified travel speed is at or above the threshold value for traveling (S003).

When determining that the travel speed is at or above the threshold value for traveling, the ECU 20 controls the actuator 7 to cause the turning plate 8 to execute the opening action. when the control of the actuator 7 by the ECU 20 is started in this way, the movable portion 10 starts executing the deployment action, and the contact area 5a having been in the stowed position starts moving toward the deployed position (S004).

When the contact area 5a reaches the deployed position, the rider's thigh is supported in a state of being lifted up by the contact area 5a. This allows, as is described above, the sitting pressure while the motorcycle is traveling to be suitably distributed, which results in the reduction of the load on the rider. In other words, while the motorcycle is traveling at a relatively high speed, the shape of the seated surface of the seating seat 1 is changed so that the rider's thigh is lifted up, thereby allowing the sitting pressure to be distributed appropriately. Thereafter, while the travel speed is continuously maintained at or above the threshold value for traveling, the contact area 5a is kept at the deployed position.

On the other hand, the speed sensor 22 remains detecting the travel speed on a regular basis, and outputs a signal indicating the detection result (S005). Then, when the motorcycle in the traveling state starts decreasing its speed for stopping, the ECU 20 identifies the travel speed based on an output signal received from the speed sensor 22, reads the threshold value for speed reduction stored in the memory 21, and determines whether or not the identified travel speed is at or below the threshold value for speed reduction (S006). If the travel speed is determined in this step S006 to be at or below the threshold value for speed reduction, the ECU 20 controls the actuator 7 to cause the turning plate 8 to execute the closing action (S007). Thereby the movable portion 10 starts executing the stowage action, and the contact area 5a having been at the deployed position starts moving toward the stowed position.

In the present embodiment, the ECU 20 controls the actuator 7 so that the contact area 5a reaches the stowed position at the point of time when the motorcycle stops. The ECU 20 controls the actuator 7 so that the degree of change of the moving speed of the contact area 5a (in a strict sense, the degree of acceleration) changes according to the degree of the speed reduction of the motorcycle. In this way, at the point of time when the motorcycle stops, the movable portion 10 becomes in the stowed state, and the contact area 5a reaches the stowed position. As a result, when the motorcycle is stopped, the rider's thigh, having been lifted up by the contact area 5a, is descended, thereby allowing the foot to easily land on the ground.

The steps S002 to S007 for the seat shape adjustment, described above, are executed repeatedly, while the rider is getting on the motorcycle, or in a strict sense, while the operation switch 24 is in the ON state. Then, at a point of time when the rider turns off the operation switch 24 and gets off the motorcycle, the seat shape adjustment ends.

Modification Example of Driving Mechanism

Regarding the above-described embodiment (more specifically, the configuration example illustrated in FIGS. 5A, 5B, 6, 7A, and 7B, which is hereinafter referred to as the "above-described embodiment"), the driving mechanism 6 as described comprises the actuator 7, the turning plates 8, the cables 9, and the contact members 30. Further, regarding the above-described embodiment, the contact member 30 as described, is bent and deformed to be in a chevron shape when the turning plate 8 is turned in an opening direction. The configuration of the driving mechanism 6, particularly the configuration of the contact member 30, however, are not limited to those described in relation with the above-described embodiment. The description below describes the modification example of the driving mechanism, while referring to FIGS. 12 to 22.

Figure 13:
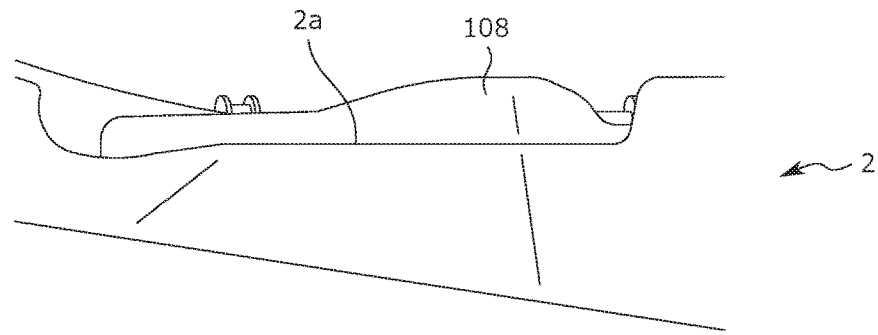
FIG. 13 is a side view illustrating an action body according to the modification example, viewed from a side (part 1).
Figure 14:
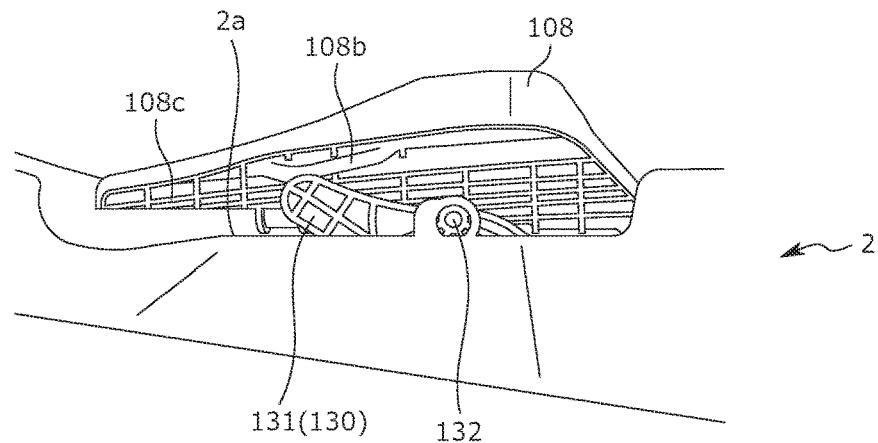
FIG. 14 is a side view illustrating an action body according to the modification example, viewed from a side (part 2).
Figure 15:
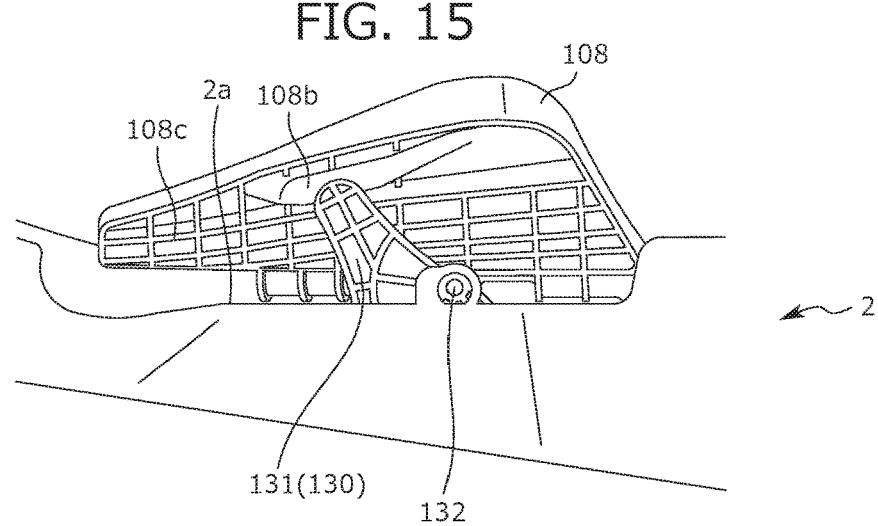
FIG. 15 is a side view illustrating an action body according to the modification example, viewed from a side (part 3).
Figure 16:
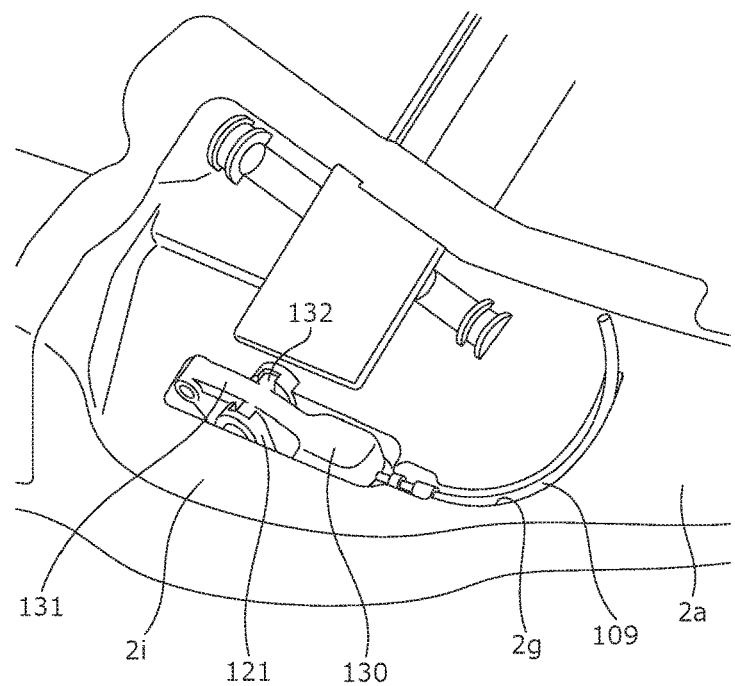
FIG. 16 is a perspective view illustrating a contact member and a housing unit according to the modification example (part 1).
Figure 17:
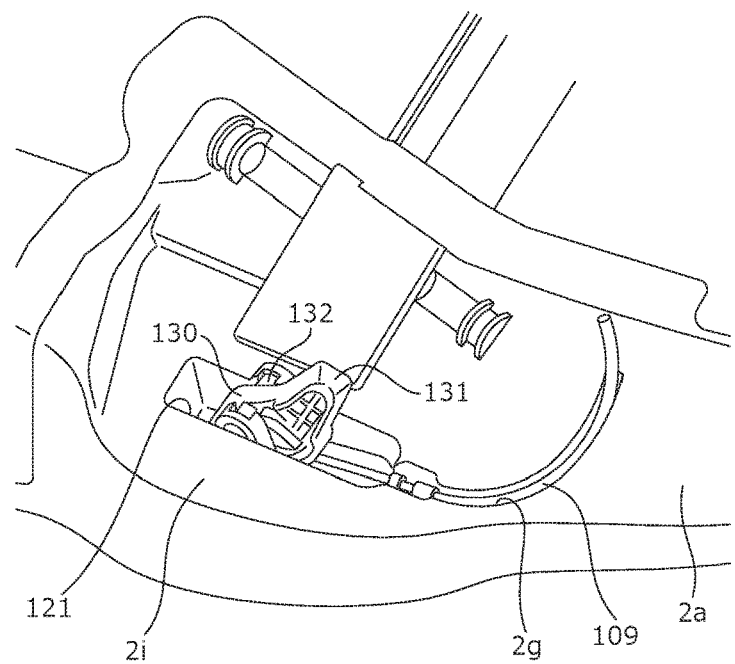
FIG. 17 is a perspective view illustrating a contact member and a housing unit according to the modification example (part 2).
Figure 18:
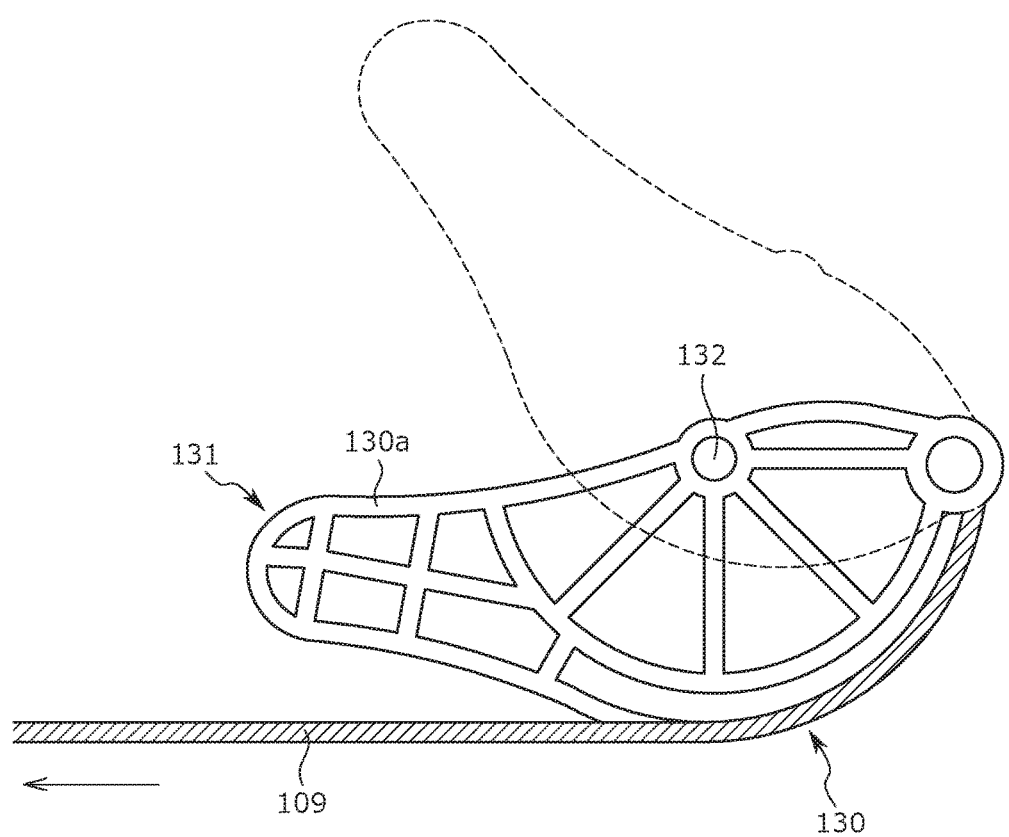
FIG. 18 is a side view illustrating a contact member according to the modification example.
Figure 19:
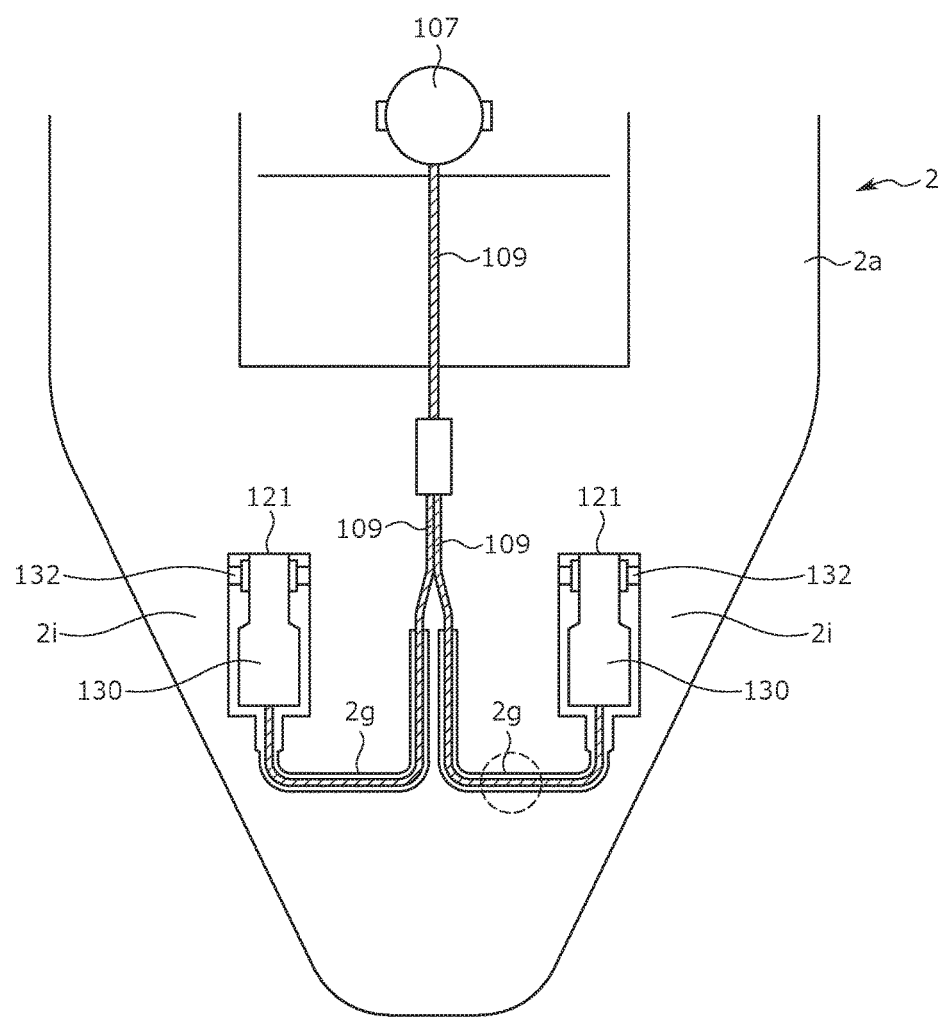
FIG. 19 illustrates a route for laying cable according to the modification example.
Figure 20:
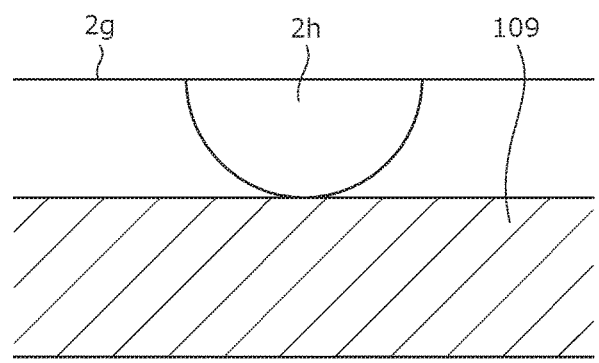
FIG. 20 is an enlarged view illustrating a part of a cable housing groove.
Figure 21:
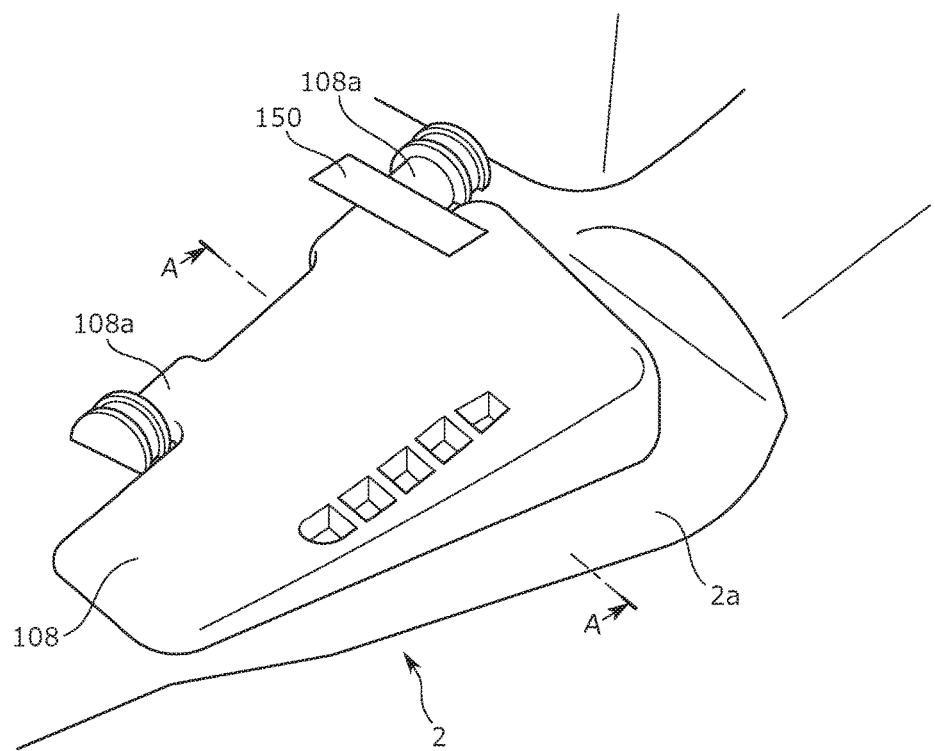
FIG. 21 illustrates a configuration in the vicinities of an action body according to the modification example.
Figure 22:
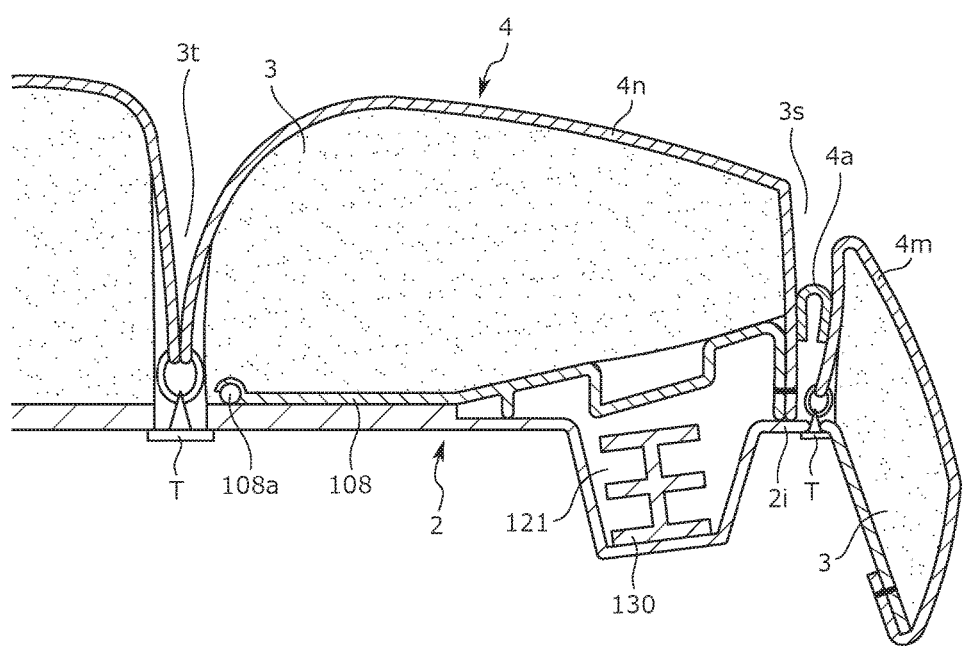
FIG. 22 is a cross-sectional view of the seat taken along a cutting plane A-A in FIG. 21.

FIG. 12 is a perspective view illustrating a driving mechanism 106 according to the modification example. It should be noted that in FIG. 12, illustrations of cables 109 and cable housing grooves 2g are omitted in order to make the drawing easy to understand. FIGS. 13 to 15 are views obtained when a turning plate 108 as an action body according to the modification example is viewed from a side. FIGS. 16 and 17 are perspective views illustrating a contact cam 130 as a contact member according to the modification example and housing units 121. FIG. 18 illustrates a side surface of the contact cam 130. FIG. 19 illustrates a route for laying the cables 109 according to the modification example. FIG. 20 is an enlarged view illustrating a part of a cable housing groove 123. FIG. 21 illustrates a configuration around the turning plate 108. FIG. 22 is a cross-sectional view of the seating seat 1, taken along a line A-A in FIG. 21.

The driving mechanism 106 according to the modification example, as is the case with the driving mechanism 6 according to the above-described embodiment, includes an actuator 107, the turning plates 108, cables 109, and the contact cams 130 as contact members. Additionally, the driving mechanism 106 according to the modification example further includes presser plates 150 illustrated in FIG. 12 as exemplary pressing members. The description below describes respective constituent components of the driving mechanism 106 according to the modification example. It should be noted that regarding the configurations of the respective components of the driving mechanism 106 according to the modification example, descriptions of those components common to the configurations of the above-described embodiment are omitted, and exclusively the contents specific to the modification example are described.

The turning plate 108 according to the modification example (hereinafter this is simply referred to as the "turning plate 108") is formed slightly thick, as illustrated in FIGS. 13 to 15. An end portion of the turning plate 108 in the width direction inner side is supported by a turning axis 108a extended in the front to back direction. Further, the turning plate 108 itself is bent three-dimensionally; in more detail, the turning plate 108 is bent in such a manner that a step is formed to make the bottom of the end portion thereof on the width direction outer side higher than the bottom of the end portion thereof on the width direction inner side. Further, as illustrated in FIGS. 13 and 21, the end portion of the turning plate 108 on the width direction outer side is bent approximately at a right angle. It should be noted that, as illustrated in FIG. 13, in the end portion of the turning plate 108 on the width direction outer side, the tip (lower end) of the bent part extends in an approximately flat form, without any protrusions or recesses being formed.

Further, as illustrated in FIGS. 14 and 15, the turning plate 108 is caused to execute the opening action, when the protruding end portion 131 of the contact cam 130, which is described below, comes into contact with the back surface of the turning plate 108 thereby pushing up the turning plate 108. It should be noted that, as illustrated in the same drawings, an area brought into contact with the protruding end portion 131, in the back surface of the turning plate 108 (i.e., the surface on the side opposed to the contact cam 130), protrudes toward the contact cam 130. This protruding part 108b thus formed improves the rigidity in the vicinities of an area to which the contact cam 130 is in contact, in the turning plate 108. The protruding parts 108b are formed in the width direction outer side areas on the back surface of the turning plate 108.

Further, as illustrated in FIGS. 14 and 15, on the back surface of the turning plate 108 except for the areas where the protruding parts 108b are formed, lattice-form reinforcement ribs 108c are formed. This allows the turning plate 108 to be further reduced in weight, with the rigidity thereof being secured. In the configuration illustrated in FIGS. 14 and 15, the reinforcement ribs 108c are formed as a rectangular lattice, but the configuration is not limited to this. The shape of the lattice formed by the reinforcement ribs 108c may be a honeycomb shape or a triangular shape.

Further, in the modification example, as is the case with the above-described embodiment, the turning plate 108 turns around the turning axis 108a positioned at an edge on the width direction inner side. On the other hand, at an end portion of the turning plate 108 in the width direction, as illustrated in FIG. 12, a presser plate 150 as a pressing member is provided to overlap the turning plate 108. This presser plate 150 is formed with, for example, a rectangular flat spring piece, and presses the end portion of the turning plate 108 on the width direction inner side toward the bottom plate 2, in a state of straddling over the turning axis 108a in the width direction.

In other words, during a normal time, the turning plate 108 is pressed by the pressing force of the presser plate 150 against the bottom plate 2 so as not to flap, and during the opening action, the turning plate 108 executes the turning action, resisting the pressing force. In this way, as a result of that the flapping of the turning plate 108 is suppressed while the turning plate 108 is not acting, the appearance of the seating seat 1 (in particular, the shape of the seated surface) is maintained excellently. In the configuration illustrated in FIG. 12, the turning plate 108 is pressed by the rectangular presser plate 150, but the configuration is not limited to this. Any configuration may be adopted so long as the configuration is configured to press the turning plate 108 to suppress the flapping of the turning plate 108, and for example, the following configuration may be adopted: a coil spring is set on the turning axis 108a, and one end of the coil spring is fixed to the end portion in the width direction of the turning plate 108, so that the turning plate 108 should be pressed.

The contact cam 130, as illustrated in FIGS. 16 and 17, is a component housed in a cavity-form housing unit 121 formed in the bottom plate 2. Regarding the housing unit 121, the housing unit 121 is provided at a position immediately under each of the turning plates 108 on the top surface 2a of the bottom plate 2, and forms a housing space whose upper end forms a rectangular opening end. This housing space has sufficient width and depth for housing an entirety of the contact cam 130.

The contact cam 130, as illustrated in FIG. 18, has an outer shape in an approximately semicircular shape as viewed from a side, and a front-side end portion thereof protrudes toward the front side while slightly elevated. Hereinafter a front-side end portion of the contact cam 130 is referred to as a protruding end portion 131. Further, on the surface positioned at a width direction edge among the outer surfaces of the contact cam 130, lattice-form reinforcement ribs 130a are formed, as illustrated in FIG. 18. This allows the contact cam 130 to be further reduced in weight, with the rigidity thereof being secured. In the configuration illustrated in FIG. 18, the reinforcement ribs 130a are provided to form an approximately rectangular lattice or a fan-shaped lattice, but the configuration is not limited to this. The shape of the lattice formed by the reinforcement ribs 130a may be a honeycomb shape or a triangular shape.

Further, the contact cam 130 is housed in the housing space, in a freely turnable state. In an upper end portion of the contact cam 130, in a part positioned slightly behind with respect to the center position in the front to back direction, a cam-side turning axis 132 is provided. This cam-side turning axis 132 is attached to the bottom plate 2 (in a strict sense, to a part thereof in the vicinities of the housing unit 121), in a state where the axis direction extends in the width direction. The contact cam 130 switches the orientation thereof by turning around the cam-side turning axis 132.

Specifically, during the normal time, the contact cam 130 is in the orientation indicated by a solid line in FIG. 18, more specifically, in such an orientation that the protruding end portion 131 is directed slightly downward. When the contact cam 130 is in such an orientation, the contact cam 130 is in a state in which the entirety thereof is housed in the housing unit 121, as illustrated in FIG. 16. On the other hand, when the contact cam 130 turns in such a manner that the protruding end portion 131 is directed upward thereby reaching the end point position in the turning range, the contact cam 130 shifts to an orientation indicated by a broken line in FIG. 18, more specifically, to such a posture that the protruding end portion 131 positioned at a slightly upper position with respect to the turning axis 132. When the contact cam 130 is in such an orientation, the contact cam 130 is in a state in which the protruding end portion 131 protrudes from the opening end (upper end) of the housing unit 121 toward the outside the housing unit 121, as illustrated in FIG. 17. In other words, the contact cam 130 turns to such a position that a part of the contact cam 130 projects out of the housing unit 121.

When the protruding end portion 131 projects out of the housing unit 121, a tip (end) of the protruding end portion 131 comes in contact with the protruding part 108b formed on the back surface of the turning plate 108. Thereafter, when the contact cam 130 further turns in the same direction as the previous turn direction, the end portion of the turning plate 108 on the width direction outer side is pushed up by the protruding end portion 131, as illustrated in FIGS. 14 and 15. This allows the turning plate 108 to perform the turning action, and allow the movable portion 10 to perform the deployment action.

The contact cam 130 configured as is described above can be housed within the housing unit 121 during the normal time (in a strict sense, when the contact area 5a, in the outer surface 5 of the seating seat 1, is positioned at the stowed position). Further, when the movable portion 10 is caused to perform the deployment action, the contact cam 130 is caused to turn so that the protruding end portion 131 of the contact cam 130 is protruded to outside the housing unit 121, thereby coming into contact with the turning plate 108 to push up the turning plate 108. This configuration makes it possible to reduce the space for arrangement of the contact cam 130, whereby the layout of the seating seat 1 can be designed excellently.

The actuator 107 according to the modification example (hereinafter simply referred to as the actuator 107) is connected to the cable 109, as is the case with the actuator 7 in the above-described embodiment, and power (turning power) is imparted to the turning plate 108 by pulling the cable 109. Specifically, the actuator 107 is positioned at a width direction center position, in a front to back direction center area on the top surface 2a of the bottom plate 2, as illustrated in FIG. 19. Further, the cable 109 connected to the actuator 107 is bifurcated as illustrated in the same drawing, and one of the branches thereof is fixed to the contact cam 130 on one end side in the width direction, and the other is fixed to the contact cam 130 on the other end side in the width direction.

When the actuator 107 pulls the cable 109, the turning power is imparted to each contact cam 130 via the cable 109.

This causes each contact cam 130 to turn, whereby the orientation of each contact cam 130 is switched from the orientation in which the entirety of the cam is housed within the housing unit 121 (hereinafter referred to as a housed orientation) to the orientation in which the protruding end portion 131 protrudes out of the housing unit 121 (hereinafter referred to as a protruding orientation). In an interlocking manner with such a turning action of the contact cam 130, the turning plate 108 performs the opening action.

In the modification example, as illustrated in FIG. 19, the cable 109 fixed to the contact cam 130 on one end side in the width direction, and the cable 109 fixed to the contact cam 130 on the other end side in the width direction, are provided separately. In other words, in the modification example, unlike the above-described embodiment, the cable 109 for transmitting the power from the actuator 107 to the turning plate 108 provided at one end portion in the width direction, and the cable 109 for transmitting the power therefrom to the turning plate 108 provided at the other end portion in the width direction, are provided separately.

Further, the above-described two cables 109 are symmetrically laid with the center in the width direction of the seating seat 1 being interposed therebetween, as illustrated in FIG. 19. Each cable 109 is fixed exclusively to a corresponding one of the contact cams 130 provided on both sides in the width direction. In other words, the power from the actuator 107 is transmitted to each of the turning plates 108 via only corresponding one of the cables 109 provided to the turning plates 108 separately. With such a configuration, as compared with the case where two cables 9 linearly connected are used as in the above-described embodiment, when the cables 109 are laid, the bending of the cables 109 in the midway of the laying route can be reduced further. This reduces the loss (traction loss) in cable traction, whereby power transmission to each turning plate 108 can be performed appropriately.

Here, the description below describes a route for laying each cable 109, while referring to FIG. 19. Each cable 109 is laid from a position behind the corresponding contact cam 130 toward a position at a front side with respect to the contact cam 130 by turning therearound. Each cable 109 is connected to the corresponding contact cam 130 from the front side of the contact cam 130, so that a distal end portion of each cable 109 is fixed to an upper rear end portion of the contact cam 130. When each cable 109 is pulled, therefore, the upper rear end portion of the corresponding contact cam 130 moves forward while descending. This causes the contact cam 130 to turn, with the orientation thereof being changed from the housed orientation indicated by a solid line in FIG. 18 to the protruding orientation indicated by a broken line therein.

In the modification example, cable housing grooves 2g are formed on the top surface 2a of the bottom plate 2, so that the cables 109 are laid as described above. These cable housing grooves 2g are grooves formed for laying the cables 109 along the top surface 2a of the bottom plate 2, and as illustrated in FIG. 19, one groove 2g is formed for each cable 109. Each cable housing groove 2g extends from the width direction center part, more specifically, forward from a position in the front to back direction from which the range of formation of the housing units 121 extends. Then, each cable housing groove 2g is bent in a U-letter shape at a position on a front side in the front to back direction with respect to the range of formation of the housing units 121, and is connected to the front edge of the housing unit 121.

Further, the cable housing groove 2g has a width and depth suitable for housing the cable 109. The cable 109, becoming housed in the cable housing grooves 2g, is thereby laid through a predetermined route.

Further, on one surface of interior walls of the cable housing grooves 2g (for example, a side wall surface), protrusion-form projected portions 2h as illustrated in FIG. 20 are formed. The projected portions 2h are formed at uniform intervals in the extending direction of the cable housing groove 2g. When the cable 109 is housed in the cable housing groove 2g, each projected portion 2h comes into contact with the cable 109. When the cable 109 is housed in the cable housing groove 2g, the above-described cable 109 is placed between the projected portions 2h and the inner wall surface on the side opposite to the side where the projected portions 2h are formed. The cable 109 housed in the cable housing groove 2g is thus positioned in the groove. In this way, the projected portions 2h for positioning, formed on the inner wall surface of the cable housing groove 2g, make it possible to more smoothly lay the cable 109, which results in the improvement of the operation efficiency in the work of assembling the seating seat 1.

In the modification example, as illustrated in FIGS. 19 and 21, the bottom plate 2 has parts jutting out for several centimeters toward the width direction outer sides with respect to the housing units 121 (that is, parts positioned on the width direction outer sides with respect to the contact cams 130). These parts comprise flat portions 2i whose top surfaces (surfaces on the same side as the outer layer member) are flat. On the other hand, as illustrated in FIG. 22, in the cushion member 3, above the positions of the flat portions 2i, there are formed fitting grooves 3s. In these fitting grooves 3s, the outer layer member 4 (in a strict sense, pieces of the outer layer member 4) is fit. As is described above, in the modification example, utilizing the space secured above the flat portion 2i, the outer layer member 4 is fit in the fitting groove 3s. As a result, the operation of fitting the outer layer member 4 can be performed more efficiently.

From the viewpoint of workability of the fitting operation, the fitting groove 3s is formed to be relatively wide. In this case, for the purpose of improving the appearance (aesthetic design) of the seating seat 1, it is desirable to arrange a sealing cloth 4a (so-called cover cloth) inside the fitting groove 3s, as illustrated in FIG. 22.

Further, in the modification example, when the turning plate 108 turns and the movable portion 10 executes the deployment action, the outer layer member 4, in particular, the end portion of the outer layer member 4 fitted into the above-described fitting groove 3s, follow excellently. As a result, slack can be prevented from occurring to the outer layer member 4 as the turning plate 108 and the movable portion 10 move, whereby the appearance of the seating seat 1 can be maintained excellently. A configuration for achieving such an effect is described hereinafter, with reference to FIG. 22.

The fitting groove 3s is now described again. The fitting groove 3s is formed above the flat portion 2i of the bottom plate 2. Into the fitting groove 3s, an end portion of the outer layer member 4 is fit, via an opening formed at an upper edge thereof. Among the pieces that compose the outer layer member 4, an end portion of the piece positioned on the outer side in the width direction (hereinafter referred to as an "outer piece 4m") and an end portion of the piece positioned on the inner side in the width direction (hereinafter referred to as an "inner piece 4n"), are fit.

Further, the fitting groove 3s includes parts that go through to the lower edge of the cushion member 3 at appropriate intervals. Further, in the cushion member 3, directly under the through parts of the fitting groove 3s, through-holes formed in the flat portion 2i are positioned. Into these through-holes, leading end portions of fastening tools T illustrated in FIG. 22 are inserted, and are projected out in the fitting groove 3s. Onto the leading end portions of the fastening tools T projected in the groove, end portions of the outer piece 4m are engaged and fixed.

Besides, the fitting groove 3s is formed wide, as described above. In particular, among the both edges of the fitting groove 3s in the width direction, the edge on the inner side is positioned very close to the width direction edge of the turning plate 8 (in a strict sense, the outer side edge). The end portion of the inner piece 4n is fit along the inner wall surface positioned on an edge of the fitting groove 3s, that is, along the side wall of the fitting groove 3s positioned on the width direction inner side.

In the seating seat 1 as configured as described above, in which the outer layer member 4 is fit in the fitting grooves 3s, when the turning plates 108 perform the opening action whereby the movable portions 10 perform the deployment action, the outer layer member 4, more specifically the inner pieces 4n, move in an interlocking manner. Here, if the inner pieces 4n are fixed to the fastening tools T that are projected out into the fitting grooves 3s as is the case with the outer pieces 4m, the inner pieces 4n possibly have slack along with actions of the turning plates 108 and the movable portions 10. Such slack may impair the appearance of the seat.

To cope with this, in the modification example, in order to prevent slack from occurring to the inner piece 4n when the turning plate 108 and the movable portion 10 move, the end portion of the inner piece 4n is fixed to the end portion of the turning plate 108 (the end portion on the width direction outer side) with a tacker, a stapler, or the like, as illustrated in FIG. 22. This allows the inner piece 4n to act integrally with the turning plate 108 when the turning plate 108 turns. In this way, as the inner piece 4n is fixed to the turning plate 108 to move integrally with the turning plate 108, the inner piece 4n can move in a state of being appropriately stretched. In other words, it is possible to prevent slack from occurring to the inner piece 4n as the turning plate 108 and the movable portion 10 move.

Regarding the configuration in which the end portion of the outer layer member 4 is fixed to the turning plate 108 so that slack is prevented from occurring to the outer layer member 4, the application of this configuration is not limited to the seat of a motorcycle or a motor-tricycle. In other words, as long as a seat is configured so that an action body such as a turning plate is moved in order to change the shape of the seated surface of the seat, the above-described configuration can be applied to the seat. For example, the above-described configuration is applicable to a vehicle seat installed in an automobile having a lumbar support function, that is, a vehicle seat in which a part in the seat for supporting the waist part moves owing to a motion of a turning plate to bulge toward ahead. Regarding an example of application to a vehicle seat, the application can be implemented with a configuration approximately similar to that illustrated in FIG. 22, or in a strict sense, a configuration in which the bottom plate 2 in FIG. 22 is replaced with a seat frame as a constituent component of a vehicle seat.

In the cushion member 3 according to the modification example, in addition to the fitting grooves 3s positioned above the flat portions 2i, fitting grooves 3t are formed. The fitting grooves 3t, as illustrated in FIG. 22, are formed on width direction inner sides with respect to the fitting grooves 3s, or more specifically, immediately beside the width direction edges of the turning plates 108 (in a strict sense, inner edges thereof). With the fitting grooves 3t formed at such positions, in the modification example, the outer layer member 4 can be appropriately fit, and further, the turning plates 108 are allowed to smoothly turn. The contents are described below with reference FIG. 22.

The basic configuration of the fitting groove 3t is identical to that of the fitting groove 3s described above. The fitting groove 3t includes parts that go through to the lower edge of the cushion member 3 at appropriate intervals, and directly under the through parts of the fitting groove 3s, through-holes formed in the bottom plate 2 are positioned. Into these through-holes, leading end portions of fastening tools T are inserted, and are projected out in the fitting groove 3s. Onto the leading end portions of the fastening tools T projected in the groove, end portions of the outer layer member 4 are engaged and fixed.

As the fitting groove 3t is a relatively deep groove, the outer layer member 4 can be fit therein more excellently. On the other hand, in a case where the deep fitting groove 3t is formed in the cushion member 3, there is a risk that the turning action of the turning plate 108 could be adversely affected, depending on the position where the fitting groove 3t is formed. On the other hand, in a case where the above-described fitting groove 3t is formed at an appropriate position, the turning plate 108 is allowed to smoothly turn.

In the modification example, as illustrated in FIG. 22, the fitting groove 3t is formed to reach, in the cushion member 3 thickness direction, the range where the turning plate 108 is present. Further, the fitting groove 3t is formed to pass beside the edge of the turning plate 108 in the width direction. The fitting groove 3t is formed to be positioned on the width direction inner side with respect to the turning plate 108, and to be adjacent to the edge of the turning plate 108 on the width direction inner side.

With the fitting groove 3t being formed at the position as described above, the turning plate 108 is allowed to turn more smoothly. Specifically, in the configuration in which the fitting groove 3t is formed at the above-described position, when the turning plate 108 turns, the turning plate 108 does not interfere with the outer layer member 4 fit in the fitting groove 3t. Further, the fitting groove 3t, which is a deep groove, is positioned immediately beside the turning axis 108a as a turning fulcrum of the turning plate 108. This causes the fitting groove 3t to function as a fulcrum when a part of the cushion member 3 that moves in an interlocking manner with the action of the turning plate 108 (that is, the turning part 3a) moves. This allows the turning plate 108 to turn more smoothly.

Regarding the configuration in which the fitting grooves 3t are formed so that the turning plates 108 and the turning parts 3a in the cushion member 3 smoothly turn, the application of this configuration is not limited to the seat of a motorcycle or a motor-tricycle. In other words, as long as a seat is configured so that an action body such as a turning plate is moved in order to change the shape of the seated surface of the seat, the above-described configuration can be applied to the seat. For example, the above-described configuration is applicable to a vehicle seat installed in an automobile having a lumbar support function, that is, a vehicle seat in which a part in the seat for supporting the waist part moves owing to a motion of a turning plate to bulge toward ahead. Regarding an example of application to a vehicle seat, the application can be realized with a configuration approximately similar to that illustrated in FIG. 22, or in a strict sense, a configuration in which the bottom plate 2 in FIG. 22 is replaced with a seat frame as a constituent component of a vehicle seat.

OTHER EMBODIMENTS

The above-described embodiment is described mainly with reference to the seat device of the present disclosure. The above-described embodiment, however, is intended to make the present disclosure more easily understood, and is not intended to limit the present disclosure. Changes and improvements can be made to the present disclosure without departing from the scope of the present disclosure, and it goes without saying that the equivalents of the present disclosure are included in the scope of the present disclosure.

Further, in the description of the embodiment, the operation switch 24, which is operated by a rider, is described as an example of a switch for turning on or off for switching the presence/absence of the control of the actuator 7 by the ECU 20. The switch, however, is not limited to the above-described operation switch 24, and another switch may be used. For example, a switch may be configured to detect whether a rider is seated on the seating seat 1. The following configuration may be proposed: a pressure sensor (not shown) is installed on the seating seat 1, the pressure sensor is turned on when the pressure (sitting pressure) applied to the seating seat 1 becomes equal to or above a predetermined value due to a rider becoming seated, and in response to this, the pressure sensor outputs a signal to the ECU 20. In this configuration as well, as is the case with the above-described embodiment, the adjustment of the position of the contact area 5a according to the travel speed of the motorcycle may be executed exclusively when the ECU 20 receives an output signal from the pressure sensor. With such a configuration, what the rider is required to do is to sit on the seating seat 1, and the rider does not have to execute an operation that functions as a trigger for automatic adjustment of the position of the contact area 5a (more specifically, the operation of turning on/off the operation switch 24)

Figure 23:
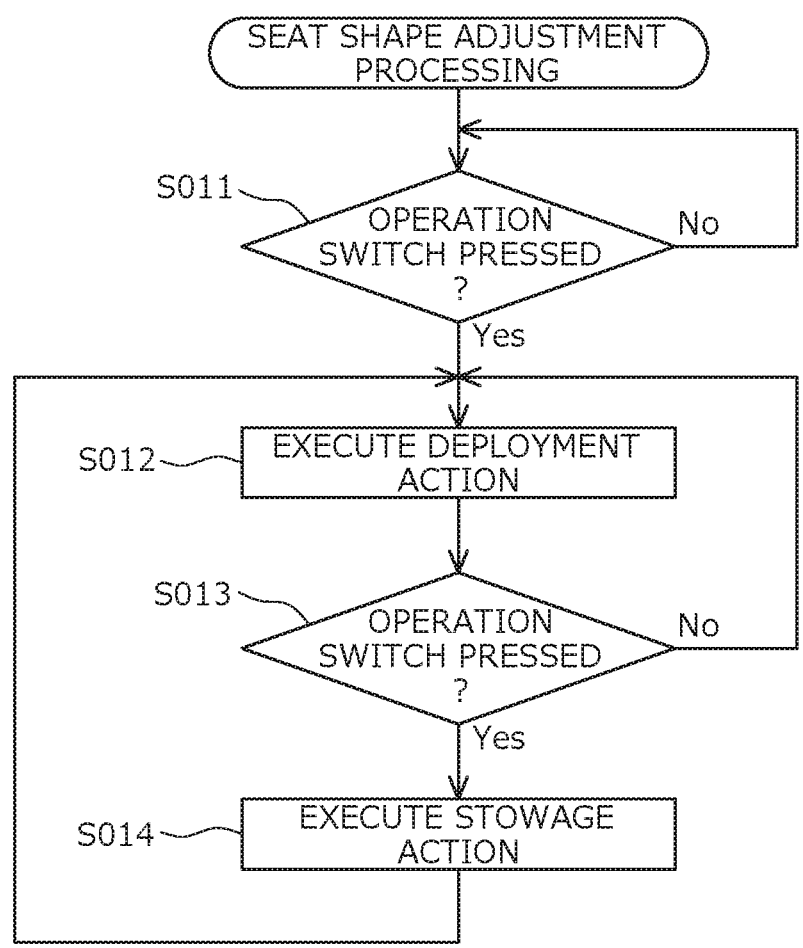
FIG. 23 illustrates a modified procedure example for a processing operation for adjusting the seat shape, according to an embodiment.

Further, in the above-described embodiment, the configuration is such that the rider turns on the operation switch 24, and thereafter the ECU 20 automatically adjusts the positions of the contact areas 5a according to the travel speed of the motorcycle. The configuration, however, is not limited to this. In other words, regarding the adjustment of the positions of the contact areas 5a, the configuration may be such that the adjustment is executed in response to an operation received from the rider. Hereinafter, a procedure of adjustment of the positions of the contact areas 5a in response to an operation received from the rider is described, with reference to FIG. 23. FIG. 23 illustrates an exemplary procedure of seat shape adjustment. In the configuration in which the positions of the contact areas 5a are adjusted in response to an operation received from the rider, as illustrated in FIG. 23, when the rider seated on the seating seat 1 turns on/off the operation switch 24, the positions of the contact areas 5a are switched in an interlocking manner with this. Specifically, when the rider turns on the operation switch 24 (S011), a signal indicating the state of the operation switch 24 is output to the ECU 20. On receiving the output signal, the ECU 20 controls the actuator 7 to cause the turning plate 8 to execute the opening action. This causes the movable portion 10 to start executing the deployment action, thereby causing the contact area 5a having been at the stowed position to move toward the deployed position (S012). On the other hand, when the rider turns off the operation switch 24 (S013), the ECU 20 controls the actuator 7 in an interlocking manner with the switching of the state of the operation switch 24, thereby causing the turning plate 8 to execute the closing action. This causes the movable portion 10 to start executing the stowage action (S014), thereby causing the contact area 5a having been at the deployed position to move toward the stowed position. As is described above, the adjustment of the position of the contact area 5a is not limited to a case where it is performed automatically according to the travel speed of the motorcycle, but the adjustment may be manually operated by the rider.

Further, in the above-described embodiment, selectable positions as the position of the contact area 5a are exclusively the stowed position and the deployed position, but the positions of the contact area 5a are not limited to these. In other words, the position of the contact area 5a may be stepwise adjustable according to the rider's preference. The operation switch 24 functions as an action amount adjusting switch to be operated for adjusting the amount of action of the turning plate 8, and is set, for example, to a greater amount of action as the time while the operation switch 24 is pressed increases. On the other hand, the ECU 20 controls the actuator 7 so that the turning plate 8 acts to an extent corresponding to the amount of action adjusted through the operation of the operation switch 24. With this configuration, the contact area 5a is allowed to move to the position corresponding to the operation of the operation switch 24 (more specifically, corresponding to the switch pressing time). In other words, the position of the contact area 5a is adjusted stepwise according to the rider's preference.

Still further, in the above-described embodiment, the turning plate 8 is used as an action body for moving the movable portion 10 to move the position of the contact area 5a. The action body, however, is not limited to the turning plate 8, and any other action body can be used so long as the action body moves the movable portion 10 to cause the contact area 5a to move between the stowed position and the deployed position; for example, the action body may be an air cell that is capable of swelling or shrinking when air is injected or discharged.

Figure 24:
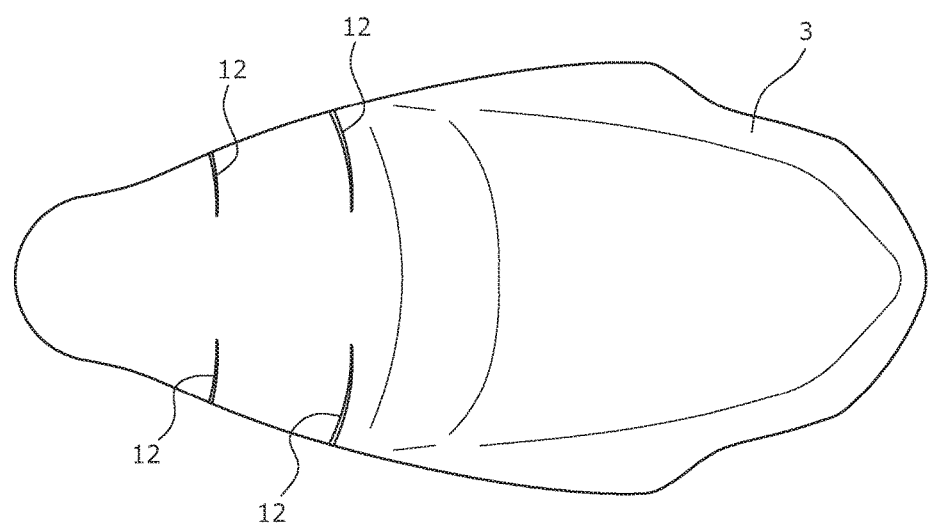
FIG. 24 illustrates a modification example of notches formed in a cushion member.

Still further, in the above-described embodiment, the slits 11 as notches are formed at boundary positions between the turning parts 3a of the cushion member 3 and the non-turning part to allow the turning parts 3a of the cushion member 3 to easily turn around the edges thereof on the width direction inner sides as base points. In the above-described embodiment, the slit 11 is formed in a shape along a part of the outer edge of the turning plate 8, the part being positioned on the width direction outer side. It should be noted that the shape of the notch provided for facilitating the turn of the turning part 3a may be a shape other than the above-described shape, and the notch may be a notch 12 that extends from a side edge of the cushion member 3 toward the width direction inner side, as illustrated in FIG. 24. FIG. 24 illustrates a modification example of notches formed in the cushion member 3, and is a view of the cushion member 3 viewed from above.

Still further, in the above-described embodiment, the actuator 7 is mounted on the top surface 2a of the bottom plate 2. In other words, the above-described embodiment is described with reference to a case where the actuator 7 is positioned above the bottom plate 2. The configuration, however, is not limited to this, and the actuator 7 may be provided below the bottom plate 2, or more specifically, provided in a state of being bonded to a lower surface of the bottom plate 2. In such a configuration, the arrangement position of the actuator 7 is more or less restricted in relation with the equipment immediately under the bottom plate 2 (the equipment located around the seat mounting part of the motorcycle main body), but this enables a reduction in deterioration of the sitting feeling (cushion performance) of the seating seat 1. By arranging the actuator 7 on the side opposite to the side where the rider is seated, the deterioration of the sitting feeling caused by the provision of the actuator 7 can be reduced.

Still further, in the above-described embodiment, in the cushion member 3, the turning parts 3a that turn are formed integrally with the non-turning part, which is the part other than the turning parts 3a, but the configuration is not limited to this. More specifically, the configuration may be as follows: the turning parts 3a and the non-turning part are prepared as separate components, and in the step of assembling the seat, the turning parts 3a are assembled with the non-turning part so that the cushion member 3 is formed.

Still further, in the above-described embodiment, the slits 11 as the interlocking property improving portions are formed in the cushion member 3, but members other than the slits 11 may be provided as the interlocking property improving portions; for example, thin portions that are thinner than surrounding portions (more specifically, grooves) may be provided, or alternatively, through holes may be provided. Alternatively, the configuration may be as follows: the turning parts 3a in the cushion member 3 are parts independent from the other part (non-turning part). In such a structure, each clearance formed between the turning parts 3a and the non-turning part functions as an interlocking property improving portion.

Still further, in the above-described embodiment, by forming the slits 11 as interlocking property improving portions in the cushion member 3, the conformity of the cushion member 3 (in a more strict sense, the turning parts 3a) to the turning action of the turning plates 8 is improved. The outer layer member 4, however, is also required to achieve the improvement of the conformity. To respond to such a request, for example, parts corresponding to the movable portions 10 in the outer layer member 4, or more specifically, parts that compose the contact areas 5a may be stretchable portions in which gathers are formed or the like so that sufficient stretchability is achieved. With this configuration, even if the turning parts 3a of the cushion 3 turn in such a direction that the rider's thighs are ascended, the outer layer member 4 can appropriately follow the same, since the stretchable portions are provided therein.

Figure 25A:
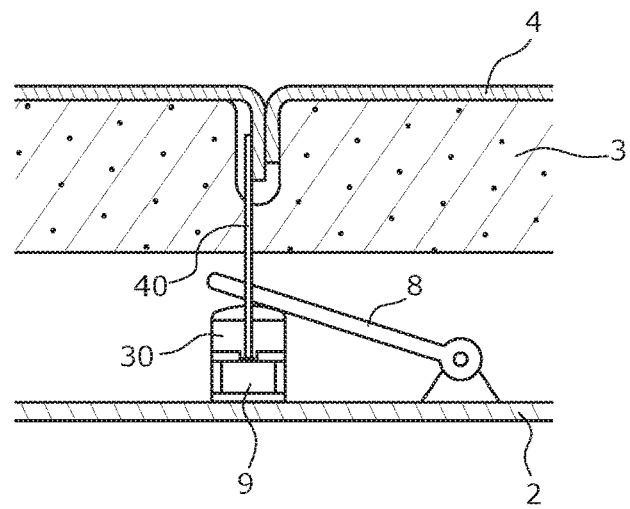
FIGS. 25A and 25B are explanatory views illustrating a configuration of the vicinities of a movable portion in a seat device according to another embodiment of the present disclosure.
Figure 25B:
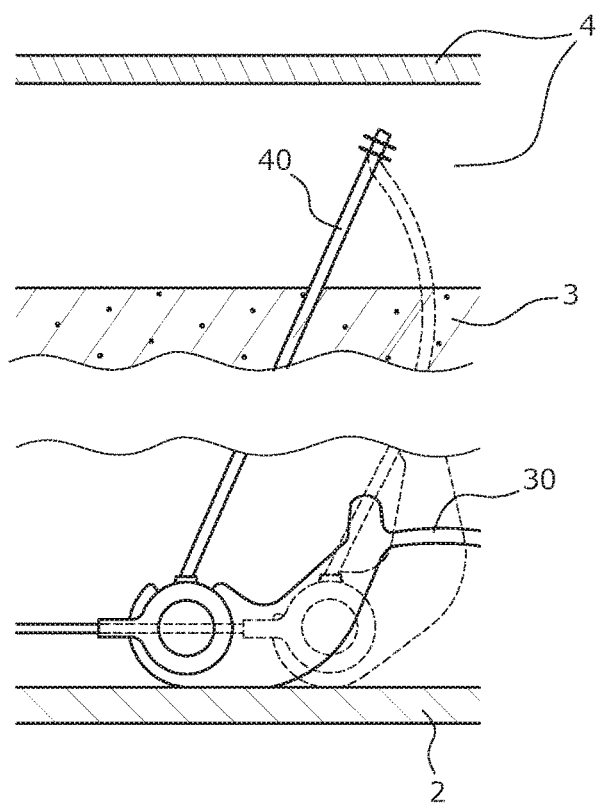

When the above-described stretchable portions are to be provided in the outer layer member 4, however, there is a risk that the stretchability of the stretchable portions decreases due to aging degradation or the like, and this causes the appearance of the outer layer member 4 to degrade. On the other hand, as a configuration that imparts conformity to the outer layer member 4 and suppresses the appearance deterioration of the outer layer member 4 due to aging degradation, the configuration illustrated in FIGS. 25A and 25B can be proposed. The description below describes an embodiment illustrated in FIGS. 25A and 25B (hereinafter referred to as another embodiment). FIGS. 25A and 25B are explanatory views of a configuration around the movable portion 10 in the seat device according to another embodiment; FIG. 25A illustrates a cross-sectional view of the configuration as viewed from the front side; and FIG. 25B illustrates a side cross-sectional view illustrating motions of the contact member 30 and a fitting member 40 to be described below.

In the other embodiment, as illustrated in FIGS. 25A and 25B, a string-shaped member (hereinafter referred to as a fitting member 40) for fitting the outer layer member 4 is fastened at a distal end portion of the cable 9 as an action transmission body. This fitting member 40 is also used in a conventional seating seat for stretching the outer layer member 4 in a state of covering the cushion member 3, and one end thereof is bonded to an end of the outer layer member 4 by sewing. When the movable portion 10 is in the stowed state, the fitting member 40 is stretched itself to impart tension (tensile force) to the outer layer member 4. When the movable portion 10 is in the stowed state, therefore, the outer layer member 4 is allowed to exhibit excellent appearance in a state in which tension is applied.

Still further, the other end of the fitting member 40 is fixed at the distal end portion of the cable 9, as described above. With this configuration, when the actuator 7 operates, the cable 9 integrally moves together with the other end of the fitting member 40, integrally with the other end.

With the above-described configuration, in the other embodiment, when the movable portions 10 perform the deployment action thereby causing the turning plates 8 to turn to be displaced toward the rider's thighs, the actuator 7 operates to pull the cables 9, thereby causing the cable 9 to move backward integrally with the other end of the fitting member 40. This causes the fitting member 40, having been in a stretched state, to make a transition into a loose state. As a result, the outer layer member 4 becomes relieved from tension that has been imparted by the fitting member 40.

On the other hand, during the deployment action of the movable portion 1, the turning part 3a of the cushion member 3 is turned by the turning action of the turning plate 8 so that the rider's thigh is pushed up. Here, the outer layer member 4 is in the state of being relieved from tension applied by the fitting member 40. Therefore, a portion of the outer layer member 4 that is positioned above the turning part 3a excellently follows the motion of the turning part 3a, thereby moving slightly upward. Thereafter, at the point of time when the part of the outer layer member 4 positioned above the turning part 3a moves to the predetermined position, the state of the fitting member 40 makes a transition from the loose state to the stretched state again. This causes tension from the fitting member 40 to be applied to the outer layer member 4 again. As a result, even when the movable portion 10 is in the deployed state, the outer layer member 4 exhibits excellent appearance in a state where tension is applied thereto.

| TABLE OF REFERENCE NUMERALS | |
|---|---|
| S | seat device |
| 1 | seating seat |
| 2 | bottom plate |
| 2a | top surface |
| 2b | guide portion |
| 2c | bulge portion |
| 2d | front surface |
| 2g | cable housing groove |
| 2h | projected portion |
| 2i | flat portion |
| 2x | recessed portion |
| 3 | cushion member |
| 3a | turning part |
| 3b | cavity |
| 3s, 3t | fitting groove |
| 4 | outer layer member |
| 4a | sealing cloth |
| 4m | outer piece |
| 4n | inner piece |
| 5 | outer surface |
| 5a | contact area |

-continued

TABLE OF REFERENCE NUMERALS

| 6 | driving mechanism |
|---|---|
| 7, 107 | actuator (power source) |
| 8, 108 | turning plate (action body) |
| 8a, 108a | turning axis |
| 9, 109 | cable |
| 10 | movable portion |
| 11 | slit |
| 11a | right-and-left edge portion |
| 11b | front-and-back edge portion |
| 12 | notch |
| 20 | ECU |
| 21 | memory |
| 22 | speed sensor |
| 23 | input section |
| 24 | operation switch |
| 30 | contact member |
| 31 | front end portion |
| 32 | rear end portion |
| 33 | intermediate portion |
| 33a | elevated portion |
| 40 | fitting member |
| 108b | protruding portion |
| 108c | reinforcement rib |
| 121 | housing unit |
| 130 | contact cam (contact member) |
| 130a | reinforcement rib |
| 131 | protruding end portion |
| 132 | turning axis |
| 150 | presser plate (pressing member) |
| T | fastening tool |

The invention claimed is:

1. A seat device comprising:
a seating portion that comprises a bottom plate, a cushion member supported by the bottom plate, and an outer layer member covering the cushion member; and
respective drive mechanisms that are provided in each of both end portions of the seating portion in a seat width direction of the seating portion, the drive mechanisms being interposed between the bottom plate and the cushion member,
wherein at least a part of the each of the both end portions comprises a movable portion that is displaced as the drive mechanisms are actuated,
wherein, the cushion member includes a notch in each of both end portions of the cushion member in the seat width direction, the notches configured to provide clearance between the movable portion of the cushion member and a non-movable portion of the cushion member when the movable portion is displaced as the drive mechanisms are actuated,
wherein each of the notches is provided on an outer side of a turning base point of the movable portion in the seat width direction and formed along an outer edge of the movable portion in the seat width direction, and
wherein each of the notches is a slit that is provided on an upper surface of the cushion member and includes a right-and-left edge portion that extends in the seat width direction and a front-and-back edge portion that is connected to the right-and-left edge portion and extends in a seat front to back direction.

2. The seat device according to claim 1, further comprising a power source configured to impart power to the drive mechanisms,
wherein the power source is provided at a position that is separated from the notch and that is interposed between the bottom plate and the cushion member.

3. The seat device according to claim 2, wherein a cable that transmits the power from the power source to the respective drive mechanisms is laid along a support surface of the bottom plate, wherein the support surface supports the cushion member.

4. The seat device according to claim 3,
wherein each of the drive mechanisms is a member in a flat plate form, and
wherein the power source includes an actuator configured to pull the cable,
the seat device further comprising a contact member that is arranged between the drive mechanisms and the bottom plate, to be in contact with the drive mechanisms,
wherein, as the cable is pulled, one end portion of the contact member with which the cable is engaged moves toward an other end portion of the contact member, which causes an intermediate portion of the contact member, positioned between the one end portion and the other end portion of the contact member, to be bent in such a direction that the intermediate portion presses the drive mechanisms, and
wherein, on the bottom plate, projection-form guide portions are provided at positions in the seat width direction between which the contact member is interposed, along the direction in which the one end portion is moved.

5. The seat device according to claim 4, wherein the bottom plate comprises, in a part positioned on an outer side in the seat width direction with respect to the contact member, a flat portion that is formed with a surface on a same side as that side of the outer layer member, the surface being flat.

6. The seat device according to claim 3,
wherein each of the drive mechanisms is a member in a flat plate form, and
wherein the cable is pulled by an actuator as the power source,
the seat device further comprising a contact member that is housed in a turnable state in a housing unit that is in a cavity form provided in the bottom plate, the contact member being in contact with the drive mechanisms,
wherein, as the cable is pulled, the contact member is turned to such a position that a protruding part of the contact member protrudes out of the housing unit, and the drive mechanisms, pressed by the protruding part of the contact member, are actuated to displace the movable portion.

7. The seat device according to claim 6, wherein, on a surface of the drive mechanisms on a side opposed to the contact member, a reinforcement rib formed in a lattice form is provided.

8. The seat device according to claim 6, wherein, in a surface of the drive mechanisms on a side opposed to the contact member, an area in contact with the contact member protrudes toward the contact member.

9. The seat device according to claim 6, wherein, on an outer surface of the contact member, a reinforcement rib formed in a lattice form is provided.

10. The seat device according to claim 3,
wherein, on the bottom plate, a cable housing groove is formed, the cable housing groove being formed for laying the cable along the support surface, and
wherein, on an interior wall of the cable housing groove, a projected portion that comes into contact with the cable housed in the cable housing groove to fix the position of the cable.

11. The seat device according to claim 3,
wherein the cable that transmits the power from the power source to the drive mechanism provided at one end portion in the seat width direction, and the cable that transmits the power from the power source to the drive mechanism provided at another end portion in the seat width direction, are provided separately, and
wherein the power from the power source is transmitted to each of the drive mechanism exclusively via corresponding one of the cables provided separately for the drive mechanisms, respectively.

12. The seat device according to claim 3, further comprising:
a contact member that is in contact with the drive mechanism,
a housing unit that is in a cavity form, provided in the bottom plate, and configured to house the contact member in a turnable state, and
a cable housing groove that is formed on the bottom plate for laying the cable along the support surface, and
wherein a cavity of the housing unit and the cable housing groove are connected.

13. The seat device according to claim 3,
wherein a cable housing groove is formed on the bottom plate, the cable housing groove being formed for laying the cable along the support surface, and
wherein a part of the cable housing groove is covered with the drive mechanism.

14. The seat device according to claim 2,
wherein the seating portion is a two-seater seating portion having a front end portion and a rear end portion on which front and rear riders of a vehicle can be seated, respectively, and
wherein the power source is arranged between seated positions of the front end portion and the rear end portion in a front to back direction of the seating portion.

15. The seat device according to claim 1,
wherein the drive mechanisms turn around a respective turning axis provided at one end side of the corresponding drive mechanism in the seat width direction, and
wherein the drive mechanisms and the turning axis are arranged at a position in the seat width direction that is outside of a range where an ischium of the rider is located.

16. The seat device according to claim 1,
the seat device further comprising:
a sensor that detects a travel speed of the vehicle;
a control mechanism that controls the drive mechanism; and
a switch that is turned between an ON state and an OFF state to switch the presence or absence of control by the control mechanism,
wherein, when the switch is in the ON state, the control mechanism controls the drive mechanism according to a detection result by the sensor.

17. The seat device according to claim 1, further comprising:
a control mechanism that controls the drive mechanisms; and
a movement amount adjustment switch configured to adjust an amount of movement of the drive mechanisms,
wherein the control mechanism controls the drive mechanisms so that the drive mechanisms are actuated to the amount of movement adjusted through the operation of the movement amount adjustment switch.

18. The seat device according to claim 1,
wherein each of the drive mechanisms is configured to turns around a respective turning axis provided at one end side of the corresponding drive mechanism in the seat width direction,
the seat device further comprising a pressing member that straddles the turning axis in the seat width direction and is configured to press the one end portion of the drive mechanisms toward the bottom plate.

19. The seat device according to claim 1,
wherein, in the cushion member, a groove for allowing the outer layer member to be fit therein is formed, and
wherein the groove is formed to extend into a depth of the cushion member where the drive mechanisms are present, and to pass along a side in the seat width direction of the drive mechanisms.

20. The seat device according to claim 1, wherein an end portion of the outer layer member is fixed to the drive mechanisms, to act integrally with the drive mechanisms.

21. The seat device according to claim 1, further comprising a power source configured to impart power to the drive mechanisms,
wherein the power source is disposed at a location between the bottom plate and the cushion member, separated from the drive mechanisms, and higher than the drive mechanisms.

22. The seat device according to claim 1, further comprising:
a contact member that is in contact with the drive mechanism, and
a first housing unit and a second housing unit, wherein each of the first housing unit and the second housing unit is in a cavity form, provided in the bottom plate, and configured to house the contact member in a turnable state, and
wherein the first housing unit and the second housing unit are arranged in the seat width direction separated from each other, and
wherein the power source is located between the first housing unit and the second housing unit in a front view.

* * * * *